US012498666B2

(12) United States Patent
Itabashi

(10) Patent No.: US 12,498,666 B2
(45) Date of Patent: Dec. 16, 2025

(54) IMAGE FORMING APPARATUS AND PROCESS CARTRIDGE WITH SEPARATABLE DEVELOPING ROLLER FROM PHOTOCONDUCTOR DRUM

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/414,649

(22) Filed: Jan. 17, 2024

(65) Prior Publication Data

US 2024/0241476 A1 Jul. 18, 2024

(30) Foreign Application Priority Data

Jan. 17, 2023 (JP) ................................ 2023-005160
Jan. 17, 2023 (JP) ................................ 2023-005161
(Continued)

(51) Int. Cl.
*G03G 21/00* (2006.01)
*G03G 15/08* (2006.01)
(Continued)

(52) U.S. Cl.
CPC ..... *G03G 21/1842* (2013.01); *G03G 15/0896* (2013.01); *G03G 21/1633* (2013.01);
(Continued)

(58) Field of Classification Search
CPC ........... G03G 15/0896; G03G 21/1633; G03G 21/1842; G03G 21/1821; G03G 21/1825;
(Continued)

(56) References Cited

U.S. PATENT DOCUMENTS 12,066,785 B2 * 8/2024 Sugimoto ............ G03G 21/186
2015/0370220 A1 * 12/2015 Hashimoto ........ G03G 21/1853 399/119

(Continued)

FOREIGN PATENT DOCUMENTS

JP 2022-050262 A 3/2022

*Primary Examiner* — Robert B Beatty
(74) *Attorney, Agent, or Firm* — Merchant & Gould P.C.

(57) ABSTRACT

An image forming apparatus includes: a process cartridge including a process frame, a photoconductor drum rotatable about a first direction, a developing roller movable between a contact position contacting the photoconductor drum and a separated position separated from the photoconductor drum, and a separation holding mechanism including a lever and an elastic member configured to urge the lever from a fourth position toward a third position and allowing the developing roller to move to the contact position in response to the lever at the fourth position receiving an external force; and a moving mechanism movable in a second direction. The moving mechanism includes a contact part contacting the lever in response to movement of the moving mechanism, a pressing part pressing the process frame toward a drawer in response to the movement, and an urging member configured to urge the pressing part toward the drawer.

20 Claims, 27 Drawing Sheets

(30) Foreign Application Priority Data

Jan. 17, 2023 (JP) ................................ 2023-005162
Jan. 17, 2023 (JP) ................................ 2023-005163

(51) Int. Cl.
*G03G 21/16* (2006.01)
*G03G 21/18* (2006.01)

(52) U.S. Cl.
CPC ..... *G03G 21/1825* (2013.01); *G03G 21/1867* (2013.01); *G03G 21/1878* (2013.01); *G03G 21/1885* (2013.01); *G03G 2221/1684* (2013.01); *G03G 2221/1823* (2013.01); *G03G 2221/1861* (2013.01); *G03G 2221/1869* (2013.01)

(58) Field of Classification Search
CPC ........... G03G 21/1853; G03G 21/1878; G03G 21/1676; G03G 21/1885; G03G 21/1823; G03G 2221/163; G03G 2221/1684; G03G 2221/1823; G03G 2221/1861; G03G 2221/1869; G03G 21/1867
USPC .................................................. 399/111, 113
See application file for complete search history.

(56) References Cited

U.S. PATENT DOCUMENTS

| | | | | |
|---|---|---|---|---|
| 2017/0248906 | A1* | 8/2017 | Tanabe | G03G 21/18 |
| 2019/0391529 | A1* | 12/2019 | Abe | G03G 21/1878 |
| 2021/0397122 | A1* | 12/2021 | Fukui | G03G 21/1825 |
| 2022/0026845 | A1* | 1/2022 | Ichiyanagi | G03G 15/751 |
| 2023/0065299 | A1* | 3/2023 | Hijikata | G03G 15/0806 |
| 2023/0176496 | A1 | 6/2023 | Fujino et al. | |
| 2023/0205129 | A1* | 6/2023 | Suetsugu | G03G 21/1814 399/111 |
| 2024/0094659 | A1* | 3/2024 | Itabashi | G03G 15/0875 |
| 2024/0103428 | A1* | 3/2024 | Itabashi | G03G 21/1842 |

* cited by examiner

IMAGE FORMING APPARATUS AND PROCESS CARTRIDGE WITH SEPARATABLE DEVELOPING ROLLER FROM PHOTOCONDUCTOR DUM

REFERENCE TO RELATED APPLICATIONS

This application claims priority from Japanese Patent Application No. 2023-005160 filed on Jan. 17, 2023, Japanese Patent Application No. 2023-005161 filed on Jan. 17, 2023, Japanese Patent Application No. 2023-005162 filed on Jan. 17, 2023, and Japanese Patent Application No. 2023-005163 filed on Jan. 17, 2023. The entire contents of the priority applications are incorporated herein by reference.

BACKGROUND ART

The present disclosure relates to an image forming apparatus.

In the related art, electrophotographic image forming apparatuses are known. For example, JP2022-050262A describes an image forming apparatus of the related art. The image forming apparatus of JP2022-050262A includes a process cartridge. The process cartridge includes a drum unit having a photoconductor drum, and a developing unit having a developing roller.

In addition, the process cartridge of JP2022-050262A includes a separation-contact mechanism. The separation-contact mechanism maintains the developing roller at a position separated from the photoconductor drum when it is not necessary to bring the developing roller into contact with the photoconductor drum. Thereby, wear of the developing roller and the photoconductor drum is suppressed. Additionally, when bringing the developing roller into contact with the photoconductor drum, the separation-contact mechanism moves the developing roller to a position where the developing roller comes into contact with the photoconductor drum by receiving an external force from the image forming apparatus.

DESCRIPTION

However, there is room for further improvement in the image forming apparatus and process cartridge of JP2022-050262A. An object of the present disclosure is to provide a new image forming apparatus and process cartridge that have further developed the related art.

The present disclosure provides an image forming apparatus comprising: a body frame having an opening; a drawer configured to be movable through the opening between a first position at which the drawer is located inside the body frame and a second position at which the drawer is drawn outward from the body frame; a process cartridge configured to be attachable to and detachable from the drawer, the process cartridge comprising: a process frame configured to store toner; a photoconductor drum configured to be rotatable about a drum axis extending in a first direction; a developing roller configured to be movable between a contact position at which the developing roller contacts the photoconductor drum and a separated position at which the developing roller being is separated from the photoconductor drum; and a separation holding mechanism comprising a lever configured to be movable with respect to the process frame between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving an external force in a state in which the lever is located at the fourth position; and a moving mechanism configured to be movable with respect to the process frame in at least a second direction intersecting the first direction, the moving mechanism comprising at least one contact part configured to be allowed to contact the lever in response to movement of the moving mechanism in the second direction, at least one pressing part configured to be allowed to press the process frame toward the drawer in response to the movement of the moving mechanism in the second direction, and at least one urging member configured to urge the at least one pressing part toward the drawer.

The present disclosure provides an image forming apparatus comprising: a body frame having an opening; a drawer configured to be movable in a third direction through the opening between a first position at which the drawer is located inside the body frame and a second position at which the drawer is drawn outward from the body frame; and a process cartridge configured to be attachable to and detachable from the drawer, the process cartridge comprising: a process frame configured to store toner; a photoconductor drum configured to be rotatable about a drum axis extending in a first direction intersecting the third direction; a developing roller configured to be movable between a contact position at which the developing roller contacts the photoconductor drum and a separated position at which the developing roller is separated from the photoconductor drum; and a separation holding mechanism comprising a lever configured to be movable with respect to the process frame in a second direction intersecting the first direction and the third direction between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving external force in a state in which the lever is located at the fourth position, wherein the body frame comprises a wall portion configured to come into contact with one end of the lever in response to the drawer mounted with the process cartridge moving in the third direction through the opening in a state in which the lever is arranged at the fourth position.

The present disclosure provides a process cartridge comprising: a process frame configured to store toner; a photoconductor drum configured to be rotatable about a drum axis extending in a first direction; a developing roller configured to be rotatable about a developing axis extending in the first direction, the developing roller being configured to be movable between a contact position at which the developing roller contacts the photoconductor drum and a separated position at which the developing roller is separated from the photoconductor drum; a separation holding mechanism comprising a lever configured to be movable with respect to the process frame between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving external force in a state in which the lever is located at the fourth position; a developing electrode located on one end side of the process frame in the first direction, the developing electrode comprising an electrical contact; and a memory located on the one end side of the process frame in the first direction, the memory comprising an electrical contact surface, wherein the lever located on the one end side of the process frame in the first direction is farther separated from the electrical contact than the memory in the first direction.

According to the above disclosure, it is possible to provide a new image forming apparatus and process cartridge that have further developed the related art.

Hereinafter, embodiments of the present disclosure will be described with reference to the drawings.

Note that in the below, a direction in which a drum axis of a photoconductor drum extends is referred to as a “first direction.” In addition, a moving direction of a first moving member is referred to as a “second direction.” Additionally, a direction in which a first lever moving member moves with respect to the first moving member is referred to as a “third direction.”

The first direction and the second direction intersect each other. Preferably, the first direction and the second direction are perpendicular to each other. The first direction and the third direction intersect each other. Preferably, the first direction and the third direction are perpendicular to each other. The second direction and the third direction intersect each other. Preferably, the second direction and the third direction are perpendicular to each other.

1. CONFIGURATION OF IMAGE FORMING APPARATUS

Figure 1:
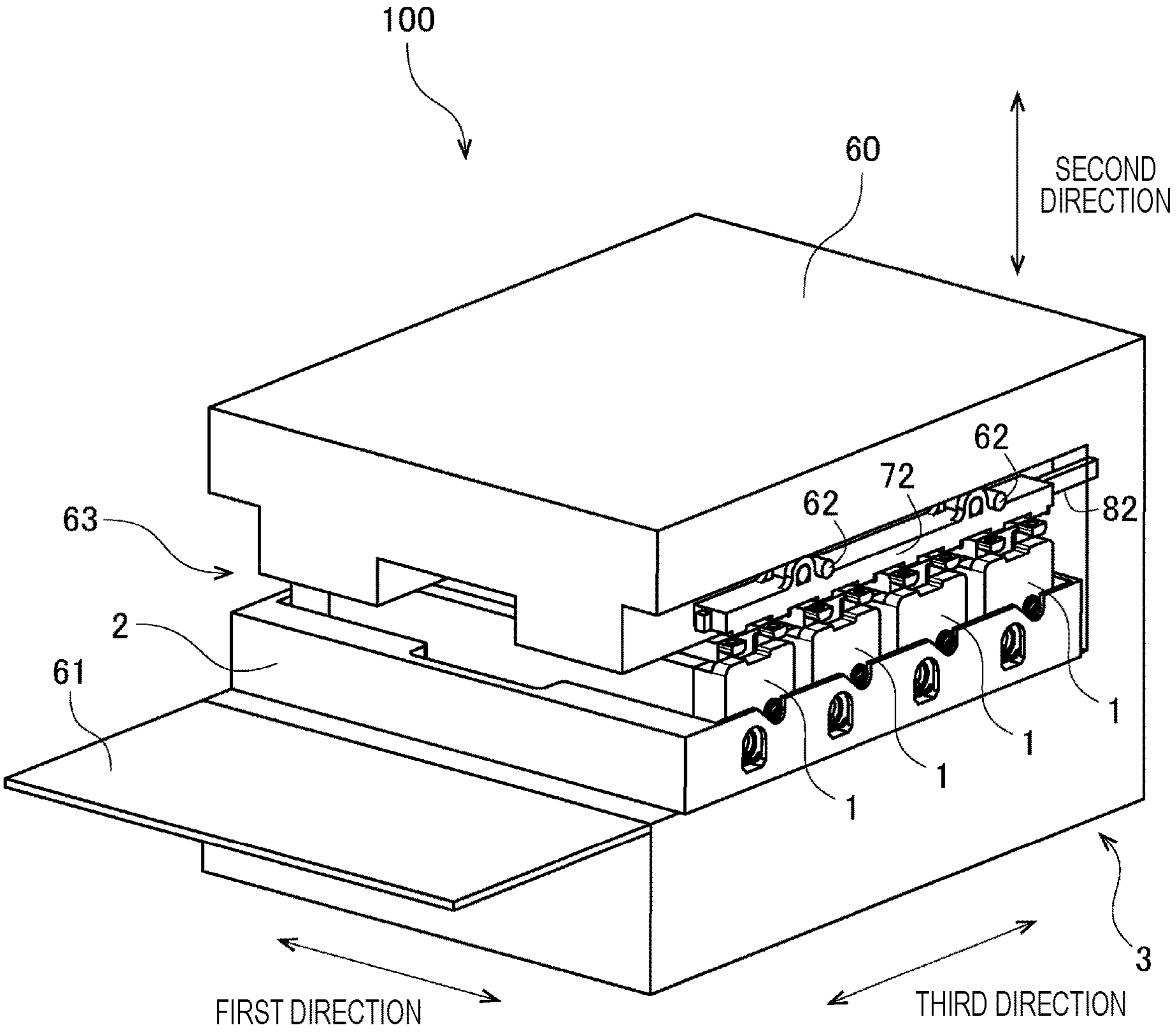
FIG. 1 is a perspective view of an image forming apparatus.

FIG. 1 is a perspective view of an image forming apparatus 100. The image forming apparatus 100 is an electrophotographic printer. Specifically, the image forming apparatus 100 is a laser printer or LED printer. As shown in FIG. 1, the image forming apparatus 100 includes four process cartridges 1, a drawer 2, and an apparatus body 3. The four process cartridges 1 are attachable to and detachable from the drawer 2. In addition, the drawer 2 mounted with the four process cartridges 1 is attachable to and detachable from the apparatus body 3. That is, the four process cartridges 1 can be mounted on the apparatus body 3 while being mounted on the drawer 2.

The four process cartridges 1 store toners of different colors (for example, yellow, magenta, cyan, and black). The image forming apparatus 100 prints an image on a surface of a printing sheet by the toners supplied from the process cartridges 1.

2. PROCESS CARTRIDGE

Figure 2:
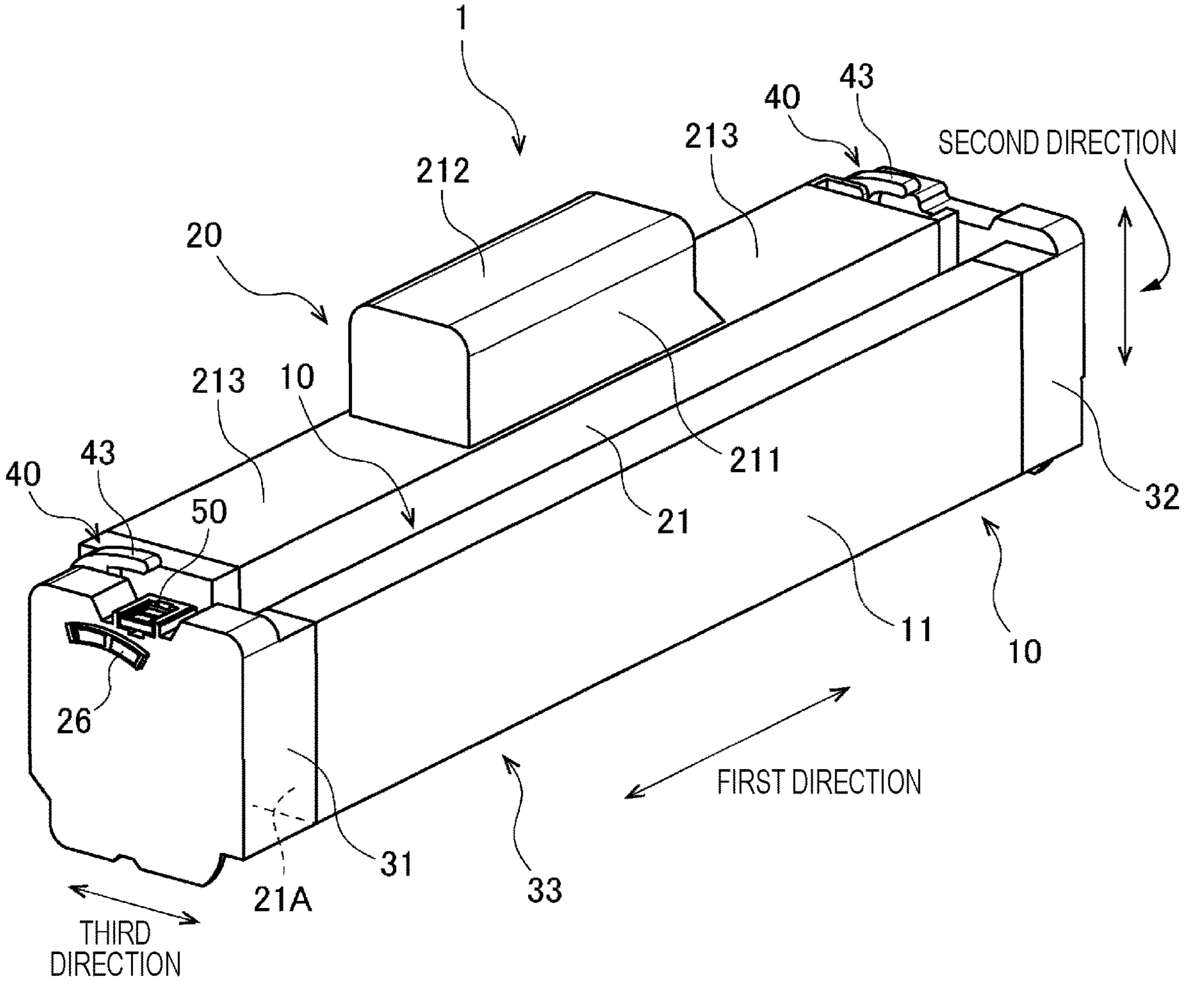
FIG. 2 is a perspective view of a process cartridge.
Figure 3:
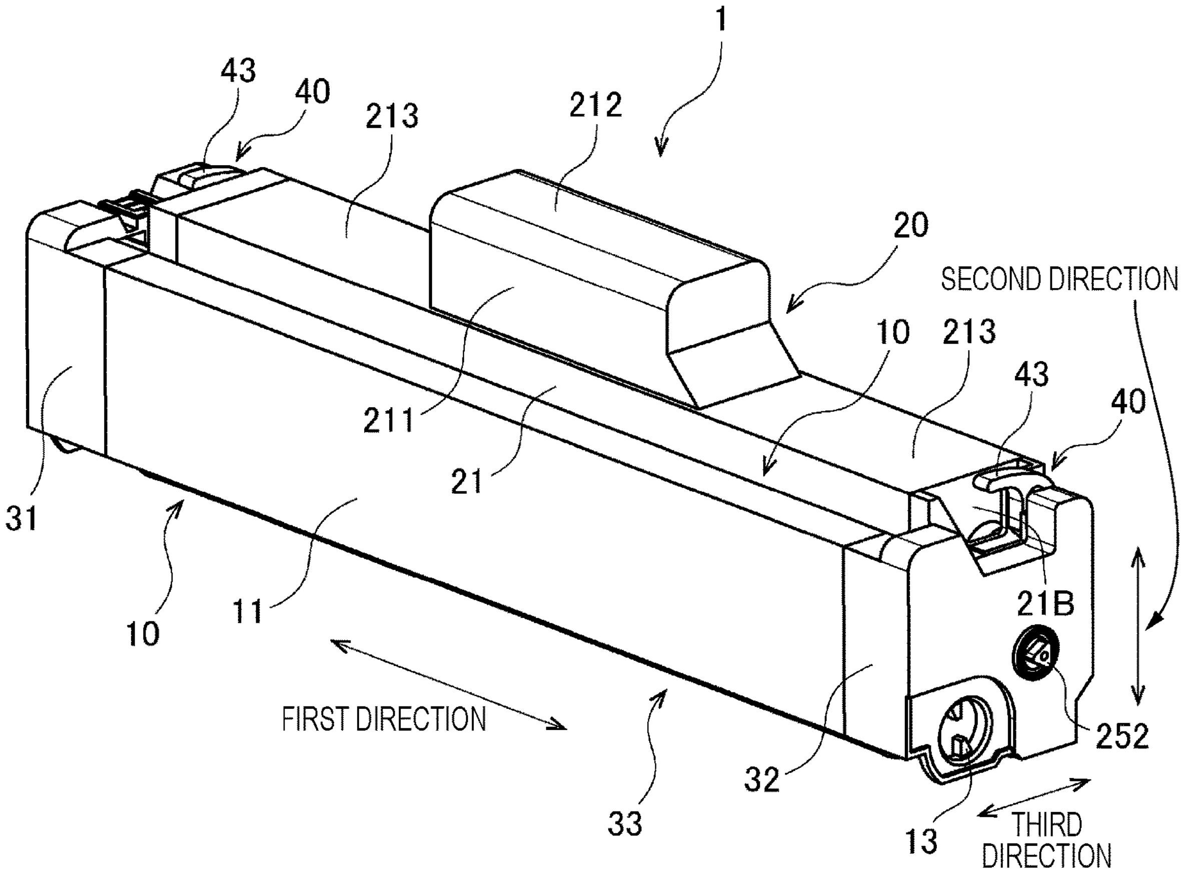
FIG. 3 is a perspective view of the process cartridge.
Figure 4:
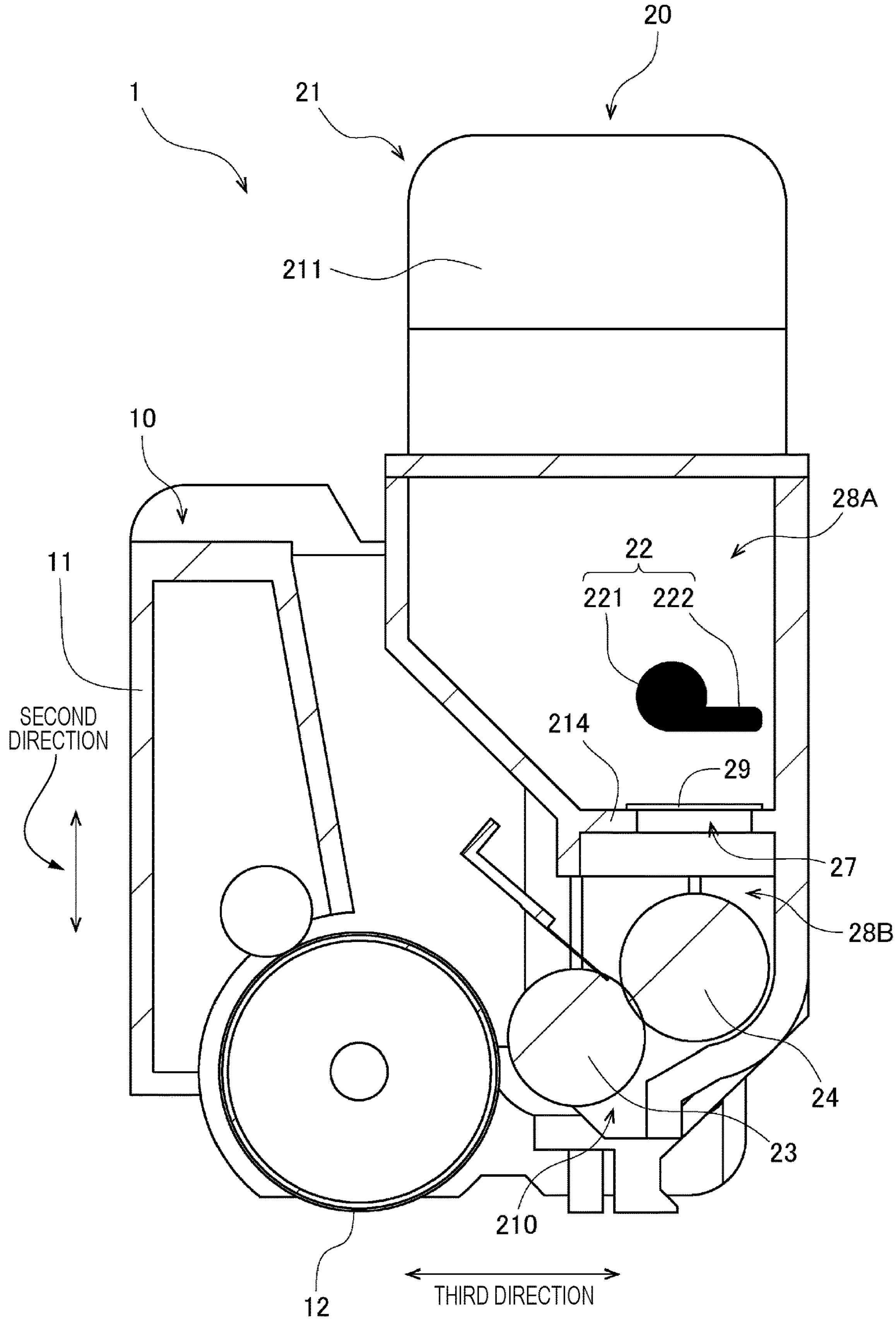
FIG. 4 is a cross-sectional view of the process cartridge taken along a plane perpendicular to a first direction.

FIGS. 2 and 3 are perspective views of the process cartridge 1. FIG. 4 is a cross-sectional view of the process cartridge 1 taken along a plane perpendicular to the first direction. As shown in FIGS. 2 to 4, the process cartridge 1 includes a drum unit 10, a developing unit 20, a first side cover 31, a second side cover 32, a separation holding mechanism 40, and a memory 50.

2-1. Drum Unit

The drum unit 10 includes a drum frame 11 and a photoconductor drum 12.

The drum frame 11 is a frame that supports the photoconductor drum 12. The drum frame 11 is located at one end of the process cartridge 1 in the third direction.

The photoconductor drum 12 is a drum that is rotatable about a drum axis extending in the first direction. The photoconductor drum 12 is located at one end portion of the drum frame 11 in the second direction. One end portion of the photoconductor drum 12 in the first direction is supported via a bearing by one end portion of the drum frame 11 in the first direction. The other end portion of the photoconductor drum 12 in the first direction is supported via a bearing by the other end portion of the drum frame 11 in the first direction. The photoconductor drum 12 has a cylindrical outer peripheral surface centered on the drum axis. The outer peripheral surface of the photoconductor drum 12 is covered with a photoconductive material.

In addition, the drum unit 10 includes a drum coupling 13. The drum coupling 13 is attached to an end portion of the photoconductor drum 12 on the second side cover 32 side. In a state in which the drawer 2 mounted with the process cartridges 1 is mounted on the apparatus body 3, the drum coupling 13 receives a driving force from the apparatus body 3. Thereby, the drum coupling 13 and the photoconductor drum 12 rotate about the drum axis.

2-2. Developing Unit

The developing unit 20 includes a developing frame 21, an agitator 22, a developing roller 23, a supply roller 24, a gear unit 25, and a developing electrode 26.

The developing frame 21 is a housing that can store toner. The developing frame 21 is located at the other end of the process cartridge 1 in the third direction. The developing frame 21 has a first outer surface 21A and a second outer surface 21B. The first outer surface 21A is located at one end of the developing frame 21 in the first direction. The second outer surface 21B is located at the other end of the developing frame 21 in the first direction. The first outer surface 21A and the second outer surface 21B are spaced apart from each other in the first direction.

As shown in FIG. 4, the developing frame 21 has a toner supply port 210. The toner supply port 210 is located at one end portion of the developing frame 21 in the second direction.

In addition, the developing frame 21 has a convex portion 211. The convex portion 211 is located at the other end portion of the developing frame 21 in the second direction. The convex portion 211 protrudes in the second direction toward the outside of the developing frame 21 at the other end portion of the developing frame 21 in the second direction. That is, the convex portion 211 protrudes in a direction away from the developing roller 23 at the other end of the developing frame 21 in the second direction. Additionally, the convex portion 211 protrudes in a direction away from the drawer 2 at the other end of the developing frame 21 in the second direction. An inside of the convex portion 211 is a part of a toner storage chamber 28A described below.

The developing frame 21 has one first surface 212 and two second surfaces 213. One first surface 212 and two second surfaces 213 are an outer surface of the other end portion of the developing frame 21 in the second direction. The first surface 212 is an outer surface of the convex portion 211. The first surface 212 is a surface that intersects the second direction. The two second surfaces 213 are located on both sides of the convex portion 211 in the first direction. The second surface 213 is a surface that intersects the second direction. The two second surfaces 213 are located closer to the developing roller 23 in the second direction than the first surface 212. Additionally, the two second surfaces 213 are located closer to the drawer 2 in the second direction than the first surface 212.

As shown in FIG. 4, the developing frame 21 includes a toner storage chamber 28A and a developing chamber 28B. The toner storage chamber 28A stores toner, in an unused state of the process cartridge 1. The developing chamber 28B stores the developing roller 23 and the supply roller 24. Specifically, the developing frame 21 has a partition wall 214. The partition wall 214 is located inside the developing frame 21. The partition wall 214 is located between one end portion and the other end portion of the developing frame 21 in the second direction. The developing chamber 28B is located between one end portion of the developing frame 21 and the partition wall 214 in the second direction. The toner storage chamber 28A is located between the other end portion of the developing frame 21 and the partition wall 214 in the second direction.

The partition wall 214 has an opening 27. The opening 27 penetrates through the partition wall 214 in the second direction. The opening 27 connects the toner storage chamber 28A and the developing chamber 28B. In an unused state of the process cartridge 1, a peel seal 29 is bonded to the opening 27. Thereby, the opening 27 is closed. When the drawer 2 mounted with the process cartridges 1 is mounted on the apparatus body 3, the peel seal 29 is collected by a collection mechanism (not shown). Thereby, the opening 27 is opened. Then, the toner in the toner storage chamber 28A is supplied to the developing chamber 28B through the opening 27.

The agitator 22 is located in the toner storage chamber 28A. The agitator 22 rotates about an agitator axis extending in the first direction. The agitator 22 has an agitator shaft 221 and a protrusion 222. The agitator shaft 221 extends in the first direction along the agitator axis. The protrusion 222 extends from the agitator shaft 221 toward an inner surface of the developing frame 21. In a state in which the drawer 2 mounted with the process cartridges 1 is mounted on the apparatus body 3, the agitator 22 is rotated by the driving force received from the apparatus body 3. Thereby, the toner in the toner storage chamber 28A is agitated.

The developing roller 23 is located in the developing chamber 28B. The developing roller 23 is a roller rotatable about a developing axis extending in the first direction. The developing roller 23 is located in the toner supply port 210 of the developing frame 21. That is, the developing roller 23 is located at one end of the developing frame 21 in the second direction. The developing roller 23 has a cylindrical outer peripheral surface centered on the developing axis. The outer peripheral surface of the developing roller 23 is formed of, for example, elastic rubber. In the state in which the drawer 2 mounted with the process cartridges 1 is mounted on the apparatus body 3, the developing roller 23 is rotated by the driving force received from the apparatus body 3.

The supply roller 24 is located in the developing chamber 28B. The supply roller 24 is a roller that supplies toner to the developing roller 23. The supply roller 24 is rotatable about a supply axis extending in the first direction. The supply roller 24 is located between the developing roller 23 and the partition wall 214. The supply roller 24 has a cylindrical outer peripheral surface centered on the supply axis. The outer peripheral surface of the supply roller 24 is in contact with the outer peripheral surface of the developing roller 23. In the state in which the drawer 2 mounted with the process cartridges 1 is mounted on the apparatus body 3, the supply roller 24 is rotated by the driving force received from the apparatus body 3.

Figure 5:
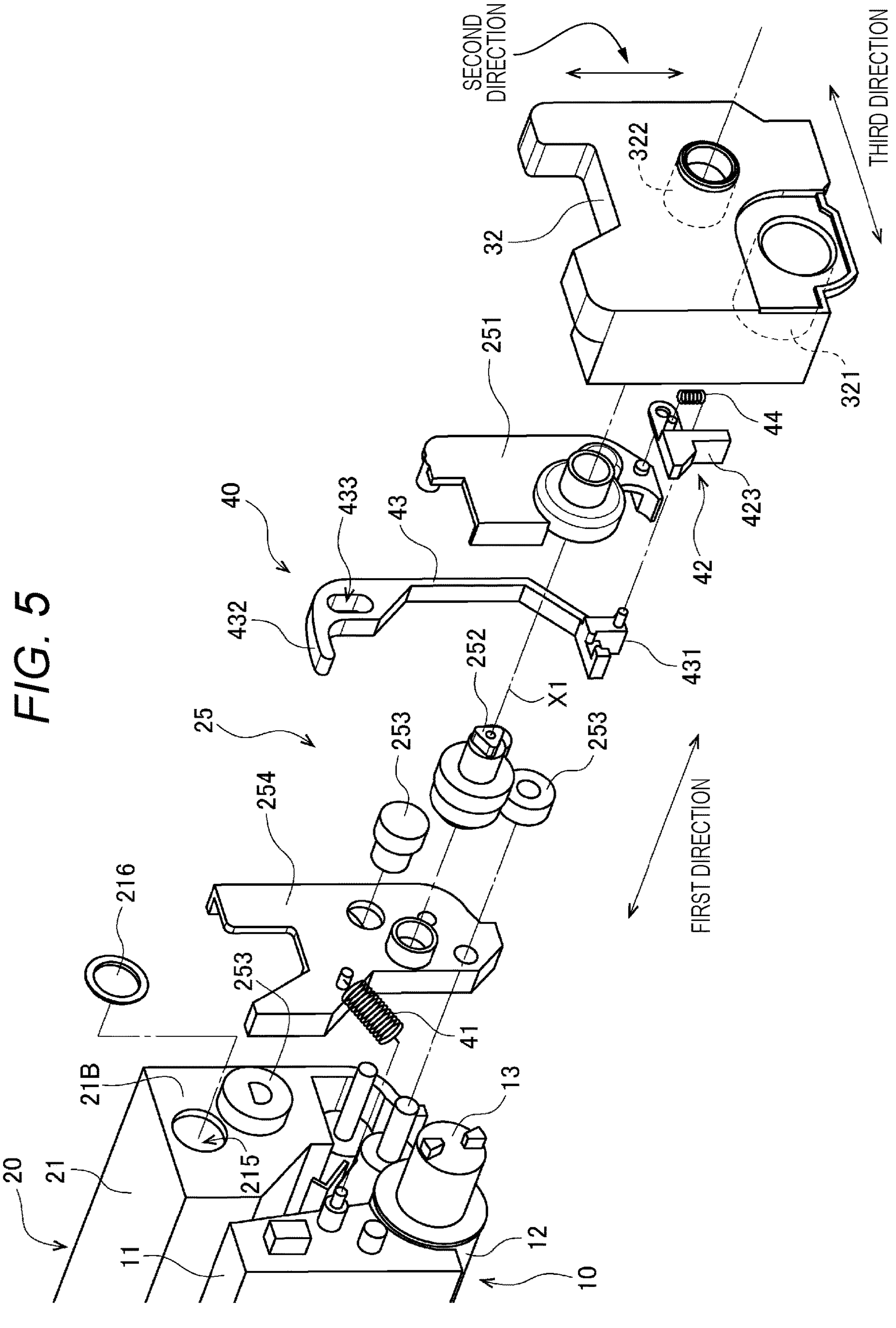
FIG. 5 is an exploded perspective view of a developing unit in the vicinity of a second outer surface.

The gear unit 25 is located on the second outer surface 21B of the developing frame 21. FIG. 5 is an exploded perspective view of the developing unit 20 in the vicinity of the second outer surface 21B. As shown in FIG. 5, the gear unit 25 includes a gear cover 251, a developing coupling 252, and a plurality of gears 253.

The gear cover 251 is located outside the second outer surface 21B. Specifically, the developing unit 20 includes a bearing plate 254. The bearing plate 254 is fixed to the second outer surface 21B. The gear cover 251 is fixed to the bearing plate 254. The gear cover 251 covers the plurality of gears 253.

The developing coupling 252 is an example of the "coupling." The developing coupling 252 is exposed from the gear cover 251. Note that the apparatus body 3 includes a driving shaft (not shown) that inputs the driving force to the developing coupling 252. When the drawer 2 mounted with the process cartridges 1 is mounted on the apparatus body 3, the driving shaft of the apparatus body 3 is connected to the developing coupling 252.

The plurality of gears 253 are located between the second outer surface 21B of the developing frame 21 and the gear cover 251. The driving force input to the developing coupling 252 from the driving shaft of the apparatus body 3 is transmitted to the agitator 22, the developing roller 23, and the supply roller 24 via the plurality of gears 253.

As shown in FIG. 5, the developing frame 21 has a charging port 215 and a cap 216. The charging port 215 is an opening for charging toner into the toner storage chamber 28A in the developing frame 21. The cap 216 is a component that closes the charging port 215. The cap 216 is attachable to and detachable from the charging port 215. In the present embodiment, the charging port 215 and the cap 216 are located on the second outer surface 21B of the developing frame 21. However, the charging port 215 and the cap 216 may also be provided at other positions on the developing frame 21.

The developing electrode 26 is located on the first outer surface 21A of the developing frame 21. That is, the developing electrode 26 is located on one end side of the developing frame 21 in the first direction. The developing electrode 26 is a conductive member. The developing electrode 26 is in contact with one end of the developing roller 23 in the first direction. Thereby, the developing electrode 26 and the developing roller 23 are electrically connected.

Figure 6:
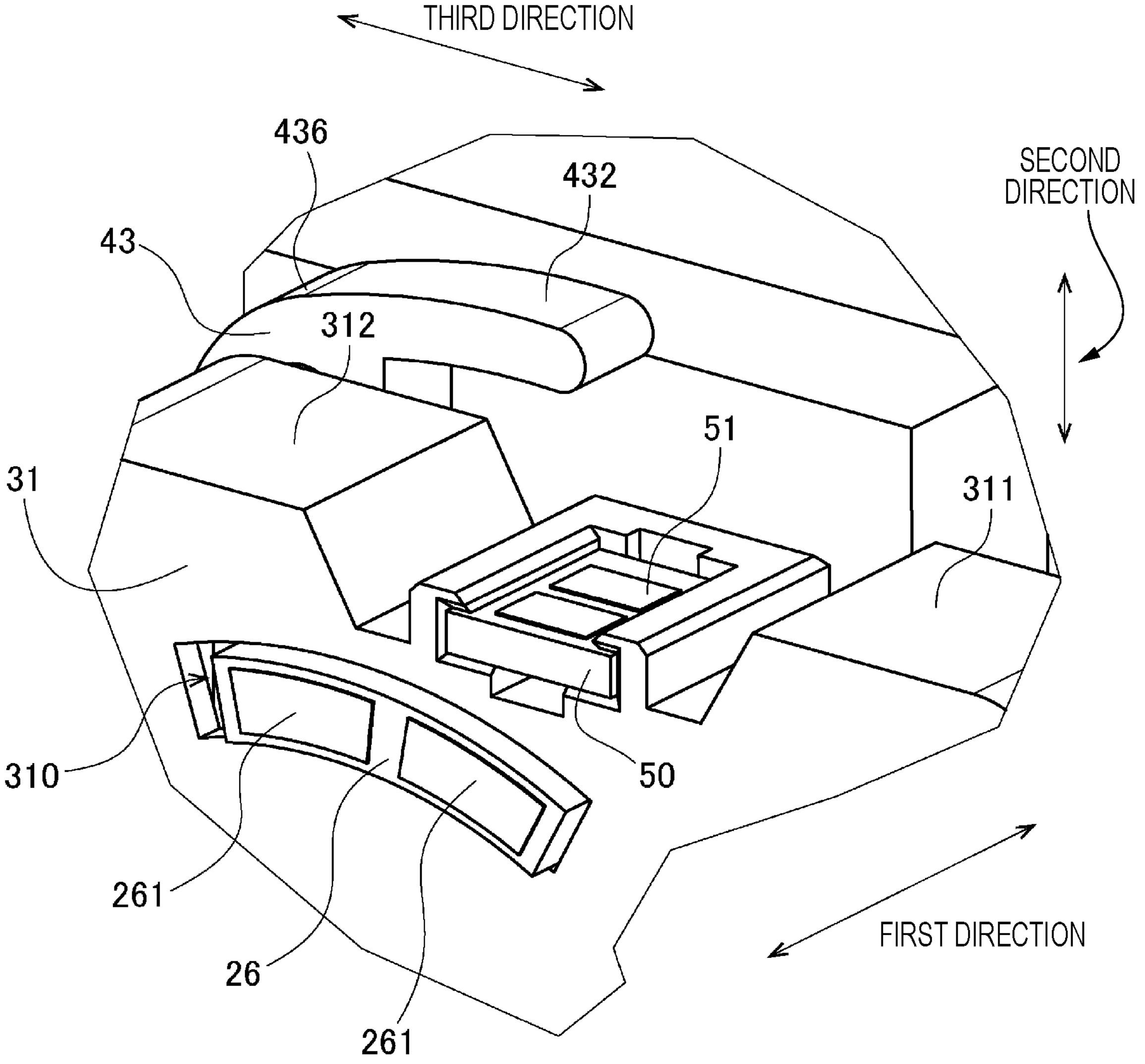
FIG. 6 is a partial perspective view of the process cartridge in the vicinity of a developing electrode.

FIG. 6 is a partial perspective view of the process cartridge 1 in the vicinity of the developing electrode 26. As shown in FIG. 6, the developing electrode 26 has an electrical contact 261. The electrical contact 261 is exposed to the outside of the process cartridge 1 through an opening 310 of the first side cover 31, which will be described below. When the drawer 2 mounted with the process cartridges 1 is mounted on the apparatus body 3, an electrode of the apparatus body 3 contacts the electrical contact 261 of the developing electrode 26. Thereby, a voltage is supplied from the apparatus body 3 to the developing roller 23 via the developing electrode 26.

Figure 7:
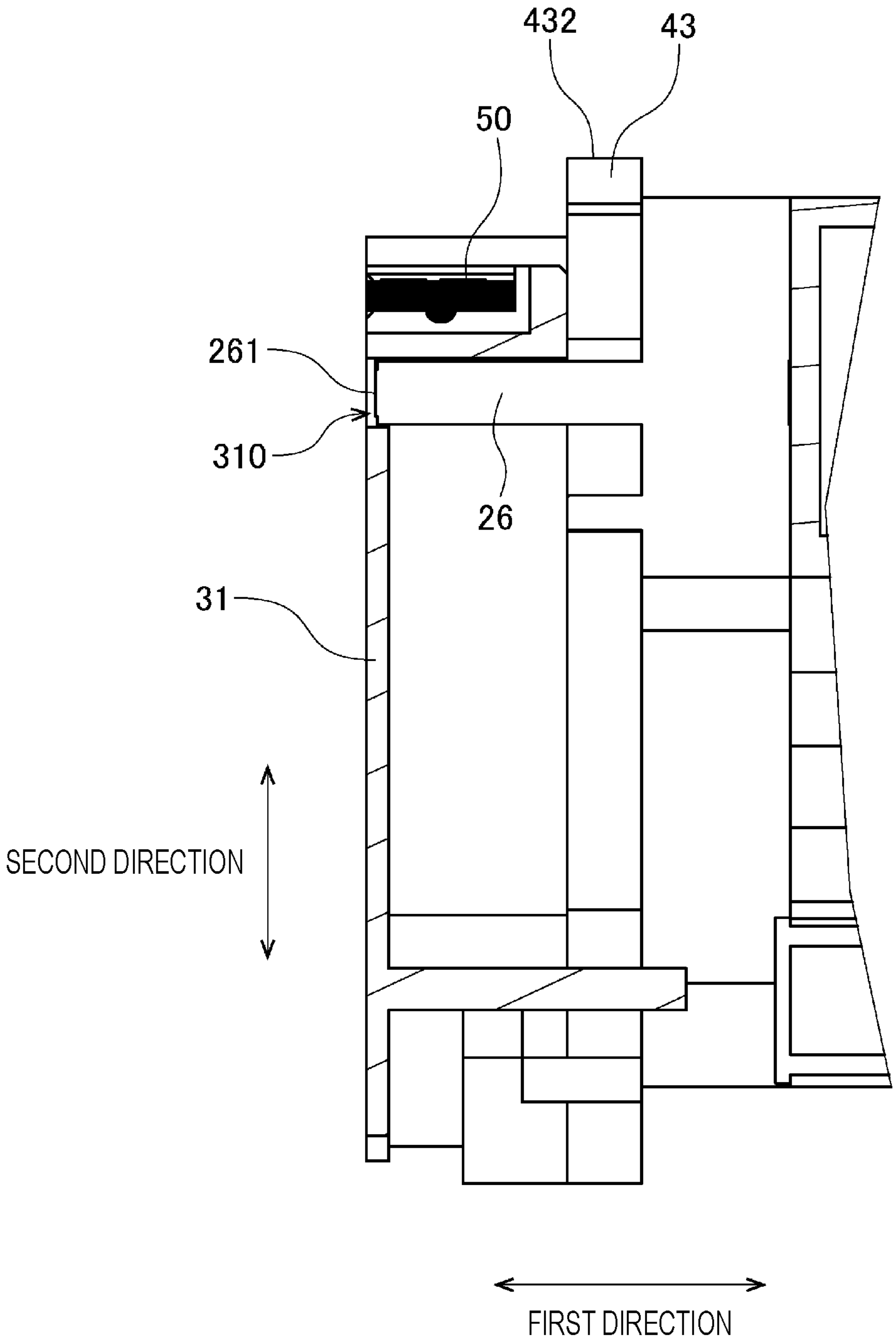
FIG. 7 is a partial cross-sectional view of the process cartridge in the vicinity of the developing electrode.

FIG. 7 is a partial cross-sectional view of the process cartridge 1 in the vicinity of the developing electrode 26. FIG. 7 shows a cross section perpendicular to the third direction. In the example of FIG. 7, the electrical contact 261 is provided at a position recessed with respect to one end surface of the first side cover 31 in the first direction. With such a configuration, it is possible to suppress the electrical contact 261 from coming into contact with a component other than the electrode of the apparatus body 3.

Figure 8:
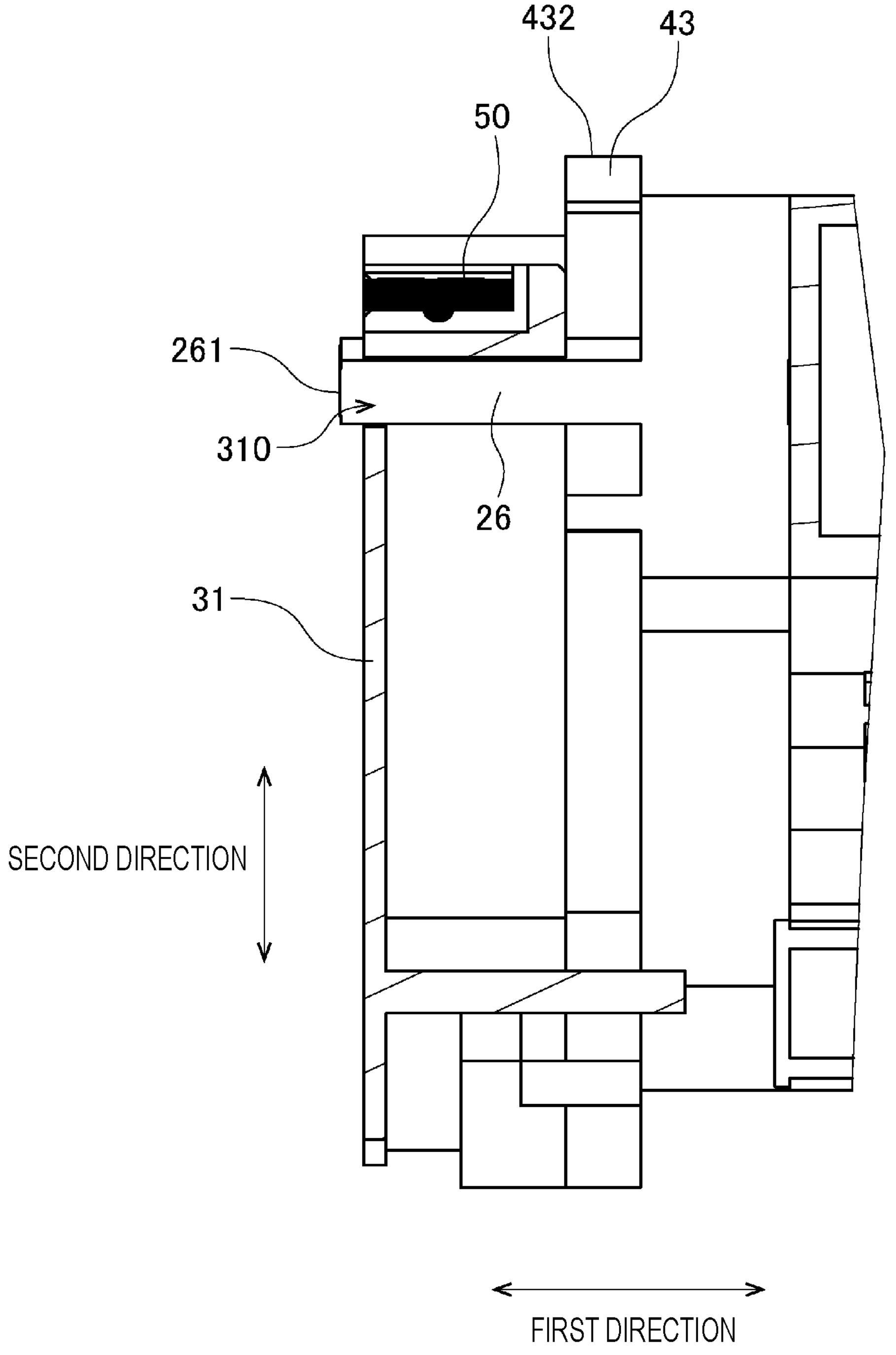
FIG. 8 is a partial cross-sectional view of the process cartridge in the vicinity of the developing electrode.

FIG. 8 is a partial cross-sectional view of the process cartridge 1 in the vicinity of the developing electrode 26 according to a modified embodiment. FIG. 8 shows a cross section perpendicular to the third direction. In the example of FIG. 8, the electrical contact 261 is provided at a position further protruding than one end surface of the first side cover 31 in the first direction. With such a configuration, the electrical contact 261 can be easily brought into contact with the electrode of the apparatus body 3.

2-3. First Side Cover and Second Side Cover

The first side cover 31 is located at one end of the process cartridge 1 in the first direction. The first side cover 31 covers one end portion of the drum frame 11 in the first direction. Additionally, the first side cover 31 covers one end portion of the developing frame 21 in the first direction.

As shown in FIGS. 6 to 8, the first side cover 31 has an opening 310. The opening 310 penetrates through the first side cover 31 in the first direction. The electrical contact 261 of the developing electrode 26 is located in the opening 310. Therefore, the electrical contact 261 of the developing electrode 26 is exposed to the outside from the first side cover 31 through the opening 310.

The second side cover 32 is located at the other end of the process cartridge 2 in the first direction. The first side cover 31 and the second side cover 32 are separated from each other in the first direction. The second side cover 32 covers the other end portion of the drum frame 11 in the first direction. Additionally, the second side cover 32 covers the other end portion of the developing frame 21 in the first direction.

As shown in FIG. 5, the second side cover 32 includes a drum collar 321 and a developing collar 322. The drum collar 321 is cylindrical and extends in the first direction. The drum collar 321 rotatably supports the drum coupling 13. That is, the drum collar 321 rotatably supports the photoconductor drum 12 via the drum coupling 13. The developing collar 322 is cylindrical and extends in the first direction. The developing collar 322 rotatably supports the developing coupling 252.

Hereinafter, the entirety of the drum frame 11, developing frame 21, first side cover 31, and second side cover 32 is referred to as "process frame 33."

2-4. Separation Holding Mechanism

The photoconductor drum 12 and the developing roller 23 are aligned in the third direction. In a state in which the process cartridge 1 is not mounted on the apparatus body 3, the developing roller 23 is arranged at a separated position at which the developing roller 23 is separated from the photoconductor drum 12. When the drawer 2 mounted with the process cartridges 1 is mounted on the apparatus body 3, the developing roller 23 is moved from the separated position to a contact position where it comes into contact with the photoconductor drum 12 by the driving force supplied from the apparatus body 3.

The process cartridge 1 includes a separation holding mechanism 40 that switches the developing roller 23 from the separated position to the contact position. The separation holding mechanism 40 is located at both end portions of the process frame 33 in the first direction. The separation holding mechanism 40 on one side is located between the first outer surface 21A of the developing frame 21 and the first side cover 31 in the first direction. The separation holding mechanism 40 on the other side is located between the second outer surface 21B of the developing frame 21 and the second side cover 32 in the first direction. Below, the separation holding mechanism 40 on the other side will be described, but the separation holding mechanism 40 on one side also has an equivalent structure.

Figure 9:
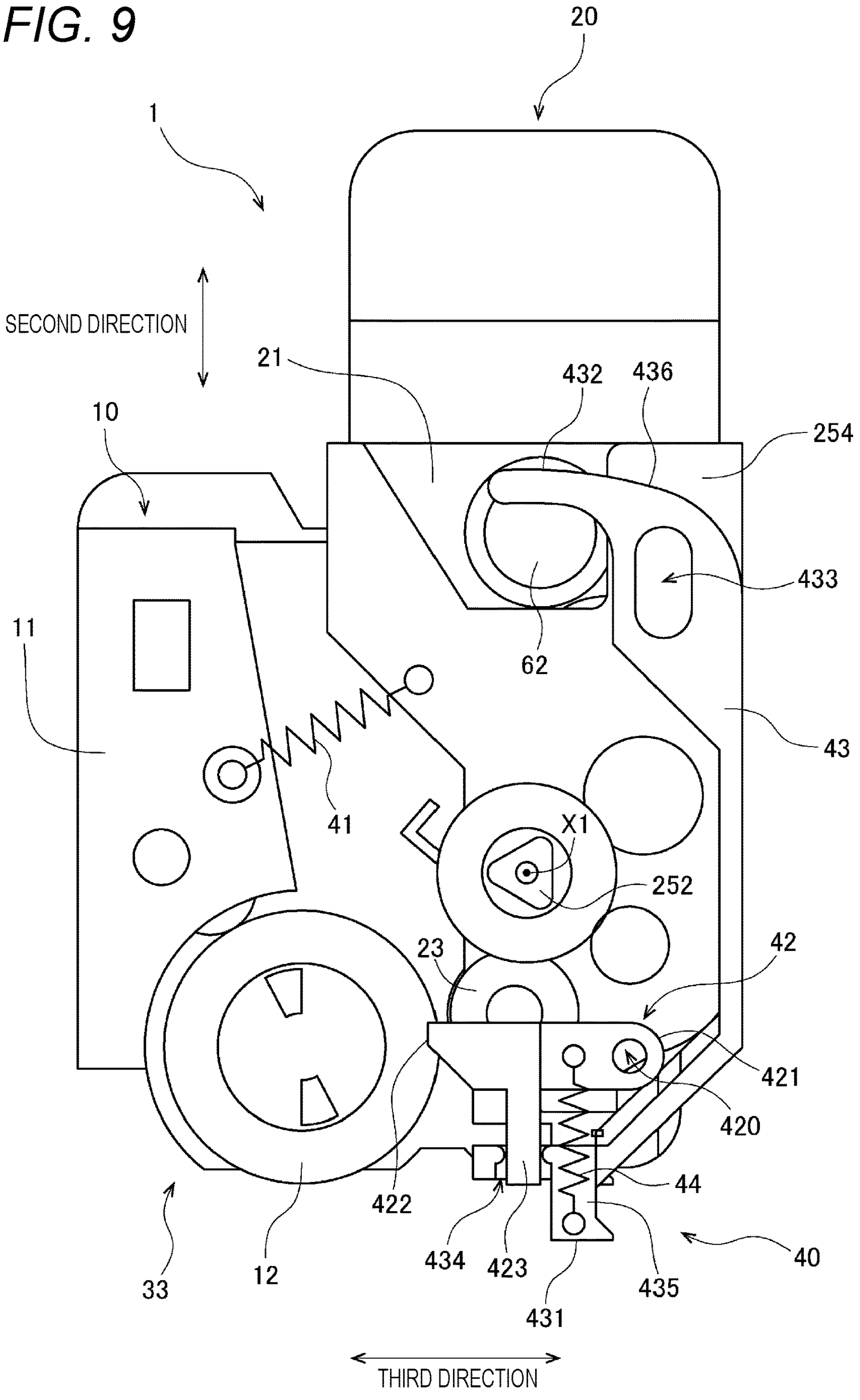
FIG. 9 is a view of the process cartridge with a second side cover and a gear cover removed, seen in the first direction from the second side cover side.
Figure 10:
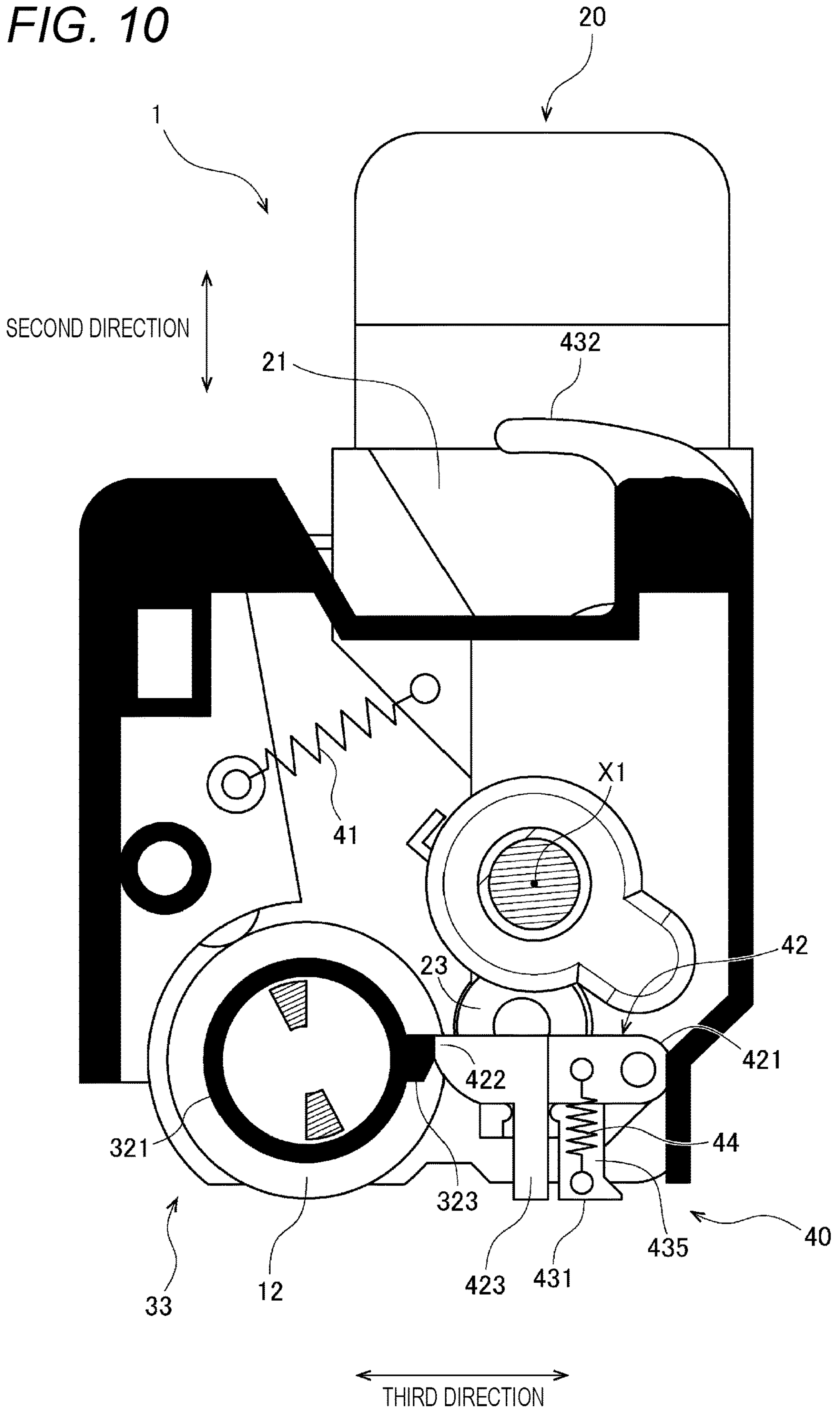
FIG. 10 is a cross-sectional view of the process cartridge.
Figure 11:
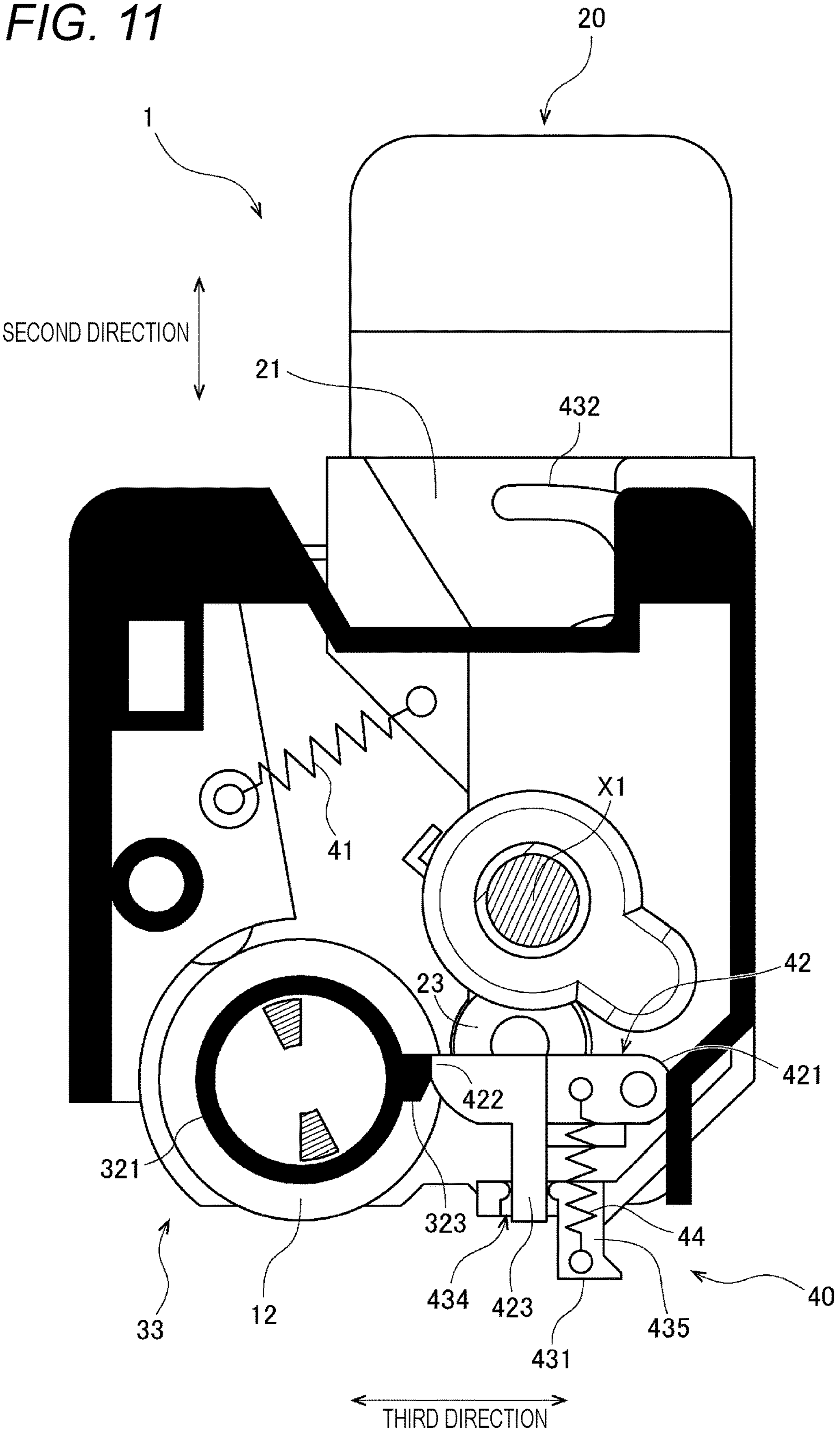
FIG. 11 is a cross-sectional view of the process cartridge.
Figure 12:
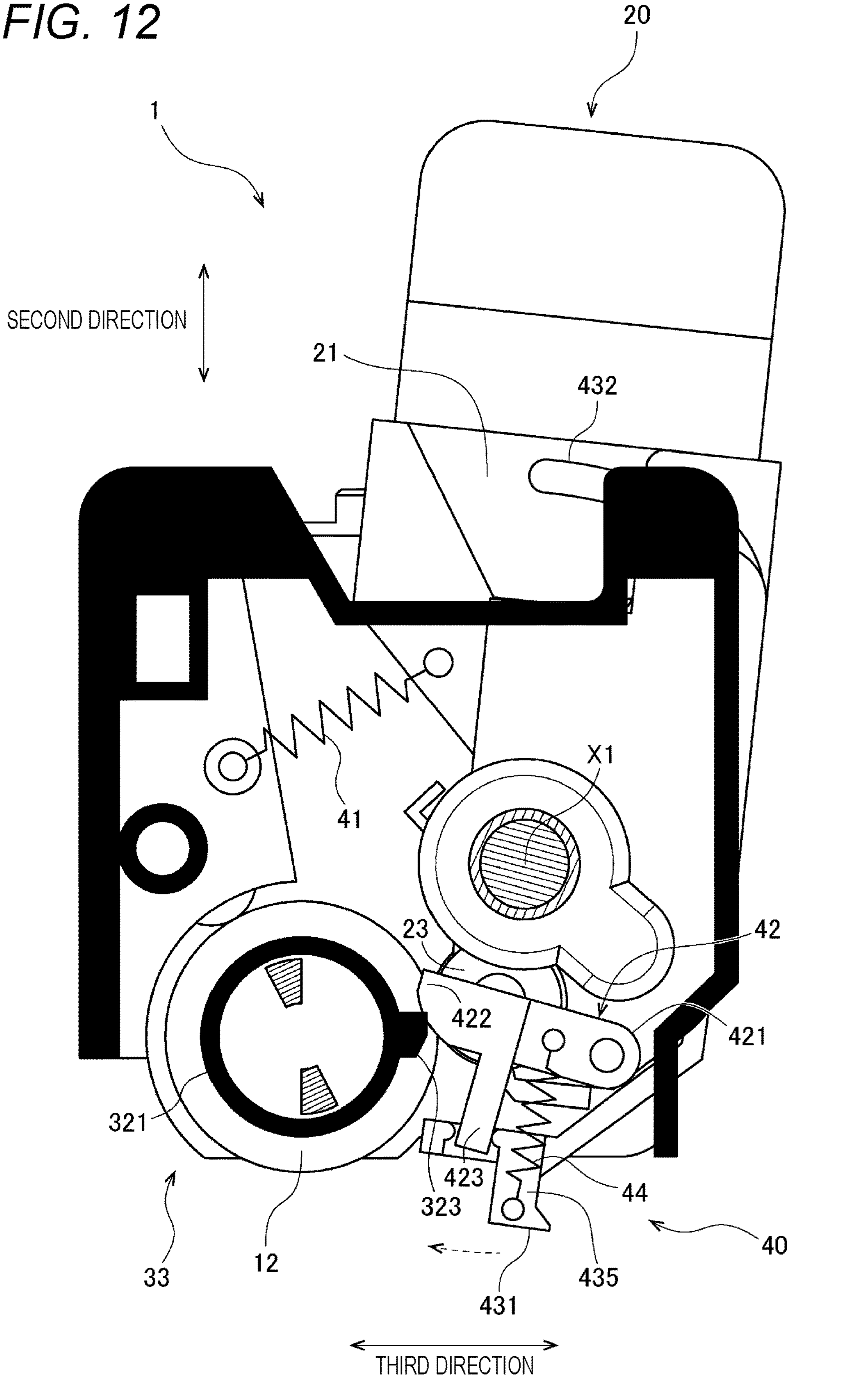
FIG. 12 is a cross-sectional view of the process cartridge.

FIG. 9 is a view of the process cartridge 1 with the second side cover 32 and the gear cover 251 removed, seen in the first direction from the second side cover 32 side. FIGS. 10 to 12 are cross-sectional views of the process cartridge 1. FIGS. 10 to 12 show cross sections perpendicular to the first direction of the process cartridge 1 at a position in the first direction including the drum collar 321. As shown in FIGS. 5 and 9 to 12, the separation holding mechanism 40 includes a first elastic member 41, a lock member 42, a lever 43, and a second elastic member 44.

The first elastic member 41 is a member that urges the developing roller 23 toward the photoconductor drum 12. The first elastic member 41 is located between the drum frame 11 and the developing frame 21. The first elastic member 41 is stretchable in the third direction. The first elastic member 41 is, for example, a coil spring. One end of the first elastic member 41 in the third direction is connected to the drum frame 11. The other end of the first elastic member 41 in the third direction is connected to the bearing plate 254. That is, the other end of the first elastic member 41 in the third direction is connected to the developing frame 21 via the bearing plate 254. However, the first elastic member 41 is not limited to the coil spring, and may also be a leaf spring or the like.

The developing frame 21 is rotatable with respect to the first side cover 31 and the second side cover 32. Specifically, the developing frame 21 is rotatable about a rotation axis X1, which is a central axis of the developing coupling 252. The rotation axis X1 is located between the developing roller 23 and the other end of the first elastic member 41 in the third direction, in the second direction. The developing roller 23 is rotatable about the rotation axis X1, together with the developing frame 21.

The first elastic member 41 is further compressed than its natural length in the third direction. For this reason, the first elastic member 41 urges a portion farther separated from the developing roller 23 than the rotation axis X1 of the developing frame 21 in the third direction and in a direction away from the drum frame 11 by elastic repulsive force. Thereby, the developing roller 23 is urged in the third direction toward the photoconductor drum 12 by the rotation of the developing frame 21 about the developing coupling 252.

The lock member 42 is a member for restricting the developing roller 23 from moving toward the photoconductor drum 12 and maintaining the developing roller 23 at a separated position separated from the photoconductor drum 12. The lock member 42 has one end 421 and the other end 422. One end 421 and the other end 422 are separated from each other in the third direction. The lock member 42 has a rotation hole 420. The rotation hole 420 penetrates through one end 421 of the lock member 42 in the first direction. A projection extending from the gear cover 251 is inserted into the rotation hole 420. Thereby, one end 421 of the lock member 42 is supported rotatably with respect to the developing frame 21.

Additionally, the lock member 42 has a lock projection 423. The lock projection 423 protrudes in the second direction from a space between one end 421 and the other end 422 of the lock member 42.

The lock member 42 rotates with respect to one end 421 between a lock position shown in FIGS. 10 and 11 and a release position shown in FIG. 12. At the lock position, the other end 422 of the lock member 42 is in contact with the drum collar 321, as shown in FIGS. 10 and 11. More specifically, the drum collar 321 has a collar projection 323 that protrudes in the third direction toward the lock member 42. At the lock position, the other end 422 of the lock member 42 is in contact with the collar projection 323. In this state, the approach of one end portion of the developing frame 21 to the drum collar 321 in the second direction is restricted. Therefore, movement of the developing roller 23 toward the photoconductor drum 12 is restricted. Thereby, the developing roller 23 is maintained at a separated position separated from the photoconductor drum 12.

On the other hand, at the release position, the other end 422 of the lock member 42 is separated from the drum collar 321, as shown in FIG. 12. More specifically, at the release position, the other end 422 of the lock member 42 is separated from the collar projection 323. In this state, one end portion of the developing frame 21 in the second direction can come closer to the drum collar 321 than in the case of the lock position. This allows the developing roller 23 to move toward the photoconductor drum 12. Therefore, the developing roller 23 can be brought into contact with the photoconductor drum 12 by the urging force of the first elastic member 41.

The lever 43 is a component that is movable in the second direction with respect to the developing frame 21. The lever 43 located on one end side of the developing frame 21 in the first direction is located between the developing frame 21 and the first side cover 31 in the first direction. In addition, as shown in FIGS. 7 and 8, the lever 43 located on one end side of the developing frame 21 in the first direction is farther separated from the electrical contact 261 of the developing electrode 26 than the memory 50 described below, in the first direction. The lever 43 located on the other end side of the developing frame 21 in the first direction is located between the bearing plate 254 and the second side cover 32 in the first direction.

As shown in FIG. 9, the lever 43 has a first end portion 431 and a second end portion 432. The first end portion 431 is one end portion of the lever 43 in the second direction. The second end portion 432 is the other end portion of the lever 43 in the second direction. The lever 43 extends in the second direction from the first end portion 431 to the second end portion 432. As shown in FIGS. 7 and 8, the second end portion 432 of the lever 43 overlaps the developing electrode 26 in the second direction.

As shown in FIG. 9, the lever 43 has a contacted surface 436. The contacted surface 436 is a surface that can come into contact with a contact part 85 described below of the apparatus body 3 in the state in which the drawer 2 mounted with the process cartridges 1 is mounted on the apparatus body 3. The contacted surface 436 is located at the second end portion 432 of the lever 43. The contacted surface 436 is inclined with respect to the third direction. Specifically, the contacted surface 436 is inclined such that as the contacted surface 436 comes close to the drum unit 10 in the third direction, it is farther separated from the developing roller 23 in the second direction.

As shown in FIGS. 5 and 9, the lever 43 has a long hole 433 extending in the second direction. The long hole 433 is located between the first end portion 431 and the second end portion 432 in the second direction. A projection extending from the gear cover 251 is inserted into the long hole 433. A length of the long hole 433 in the second direction is longer than a length of the projection of the gear cover 251 in the second direction. For this reason, the lever 43 is adapted to be movable in the second direction between a third position shown in FIG. 10 and a fourth position shown in FIGS. 11 and 12 with respect to the process frame 33. The fourth position is a position closer to the drawer 2 than the third position in the second direction. Additionally, the fourth position is a position farther separated from the memory 50 described below than the third position in the second direction. In a state in which the lever 43 is arranged at the third position, the second end portion 432 of the lever 43 protrudes in the second direction beyond the memory 50 described below.

The first end portion 431 of the lever 43 has a lever hole 434 and a lever projection 435. The lever hole 434 penetrates through the first end portion 431 of the lever 43 in the second direction. The lock projection 423 is inserted into the lever hole 434. The lever projection 435 extends in the second direction at the first end portion 431 of the lever 43. In a state in which the lever 43 is arranged at the third position, the lever projection 435 does not protrude in the second direction from one end portion of the process frame 33 in the second direction. In a state in which the lever 43 is arranged at the fourth position, the lever projection 435 protrudes in the second direction from one end portion of the process frame 33 in the second direction. That is, in the state in which the lever 43 is arranged at the fourth position, the first end portion 431 of the lever 43 protrudes from the process frame 33 toward the drawer 2 in the second direction.

The second elastic member 44 is located between the first end portion 431 of the lever 43 and the lock member 42. The second elastic member 44 is an example of the "elastic member." The second elastic member 44 is stretchable in the second direction. The second elastic member 44 is, for example, a coil spring. One end of the second elastic member 44 in the second direction is connected to the lever projection 435. The other end of the second elastic member 44 in the second direction is connected to the lock member 42. However, the second elastic member 44 is not limited to the coil spring, and may also be a leaf spring or the like.

The second elastic member 44 further extends in the second direction than a natural length. For this reason, the second elastic member 44 pulls the first end portion 431 of the lever 43 toward the lock member 42 by elastic contractive force. Thereby, the lever 43 is urged from the fourth position toward the third position. Additionally, the second elastic member 44 pulls the lock member 42 toward the first end portion 431 of the lever 43 by elastic contractive force. Thereby, the lock member 42 is urged from the release position toward the lock position.

In a state in which the process cartridge 1 is not mounted on the apparatus body 3, no external force acts on the separation holding mechanism 40. In this state, the lever 43 is arranged at the third position by the elastic contractive force of the second elastic member 44. Additionally, the lock member 42 is arranged at the lock position by the elastic contractive force of the second elastic member 44. Therefore, the developing roller 23 is maintained at a separated position separated from the photoconductor drum 12.

When the drawer 2 mounted with the process cartridges 1 is mounted on the apparatus body 3, the contact part 85 described below of the apparatus body 3 pushes the second end portion 432 of the lever 43. Thereby, the lever 43 is moved from the third position shown in FIG. 10 to the fourth position shown in FIG. 11. When the lever 43 is arranged at the fourth position, the lever projection 435 protrudes from the process frame 33 toward the drawer 2.

In this state, the apparatus body 3 pushes the lever projection 435 in the third direction toward the photoconductor drum 12, as shown by a broken line arrow in FIG. 12. Thereby, the first end portion 431 of the lever 43 is moved in the third direction toward the photoconductor drum 12. Then, the lever 43 presses the lock projection 423, and the lock projection 423 together with the lever hole 434 is also tilted in the third direction toward the photoconductor drum 12. As a result, the lock member 42 rotates with respect to one end 421 from the lock position shown in FIG. 11 to the release position shown in FIG. 12.

Then, when the lock member 42 is arranged at the release position, the developing roller 23 is moved in the third direction toward the photoconductor drum 12 by the urging force of the first elastic member 41. As a result, the developing roller 23 comes into contact with the photoconductor drum 12. That is, the developing roller 23 moves from the separated position to the contact position.

In addition, when separating the developing roller 23 from the photoconductor drum 12, the apparatus body 3 pushes the lever projection 435 in a direction away from the photoconductor drum 12. Thereby, the first end portion 431 of the lever 43 moves away from the photoconductor drum 12 in the third direction. Then, the lever 43 presses the lock projection 423, and the lock projection 423 together with the lever hole 434 is also moved away from the photoconductor drum 12 in the third direction. As a result, the lock member 42 rotates with respect to one end 421 from the release position shown in FIG. 12 to the lock position shown in FIG. 11. As a result, the developing roller 23 separates from the photoconductor drum 12. That is, the developing roller 23 moves from the contact position to the separated position.

2-5. Memory

The memory 50 is a storage medium that stores information about the process cartridge 1. The memory 50 is, for example, an IC chip. In the memory 50, for example, information about the specification or life of the process cartridge 1 is stored. The memory 50 is located at one end of the process frame 33 in the first direction. Specifically, the memory 50 is attached to the first side cover 31.

As shown in FIG. 2, the memory 50 overlaps the developing frame 21 in the first direction. The memory 50 may overlap the convex portion 211 of the developing frame 21 in the first direction. Additionally, as shown in FIGS. 6 to 8, the memory 50 overlaps the developing electrode 26 in the second direction.

As shown in FIG. 6, the memory 50 has an electrical contact surface 51. The electrical contact surface 51 is a surface where a copper foil is exposed. The electrical contact surface 51 intersects the second direction. In addition, in the state in which the drawer 2 mounted with the process cartridges 1 is mounted on the apparatus body 3, the electrical contact surface 51 faces the first moving member 71, which will be described below, in the second direction.

As shown in FIG. 6, the first side cover 31 has a first convex surface 311 and a second convex surface 312. The first convex surface 311, the second convex surface 312, and the electrical contact surface 51 are located in the same plane perpendicular to the first direction. The first convex surface 311 and the second convex surface 312 are separated from each other in the third direction. The electrical contact surface 51 is located between the first convex surface 311 and the second convex surface 312 in the third direction.

The first convex surface 311 and the second convex surface 312 further protrude in a direction away from the photoconductor drum 12 than the electrical contact surface 51 in the second direction. That is, the first convex surface 311 and the second convex surface 312 further protrude in a direction away from the drawer 2 than the electrical contact surface 51 in the second direction. In the state in which the drawer 2 mounted with the process cartridges 1 is mounted on the apparatus body 3, the first convex surface 311 and the second convex surface 312 are located closer to the first moving member 71, which will be described below, than the electrical contact surface 51 in the second direction.

3. DRAWER

The drawer 2 is a unit that can hold the four process cartridges 1. The process cartridge 1 is mounted on the drawer 2 in the second direction. In a state in which the process cartridge 1 is mounted on the drawer 2, one end portion of the process cartridge 1 in the second direction is arranged inside the drawer 2. Specifically, the photoconductor drum 12 and the developing roller 23 are arranged inside the drawer 2.

In addition, in the state in which the process cartridge 1 is mounted on the drawer 2, the other end portion of the process cartridge 1 in the second direction is exposed to the outside of the drawer 2. Specifically, the convex portion 211 of the developing frame 21, the electrical contact 261 of the developing electrode 26, the contacted surface 436 of the lever 43, the first convex surface 311 of the first side cover 31, the second convex surface 312 of the first side cover 31, and the memory 50 are exposed to the outside of the drawer 2.

4. APPARATUS BODY

The apparatus body 3 includes a body frame 60, a front cover 61, a cam 62, and a moving mechanism. The moving mechanism includes a first moving member 71, a second moving member 72, a first lever moving member 81, and a second lever moving member 82.

The body frame 60 is a housing that can store therein the drawer 2 mounted with the four process cartridges 1. As shown in FIG. 1, the body frame 60 has an opening 63. The opening 63 is located at one end of the body frame 60 in the third direction.

The front cover 61 rotates about an axis extending in the first direction between an open position at which the opening 63 is opened and a closed position at which the opening 63 is closed. In a state in which the front cover 61 is arranged at the open position, the drawer 2 is movable in the third direction. Specifically, the drawer 2 is movable in the third direction through the opening 63 between a first position at which the drawer 2 is located inside the body frame 60 and a second position at which the drawer 2 is drawn outward from the body frame 60.

Figure 13:
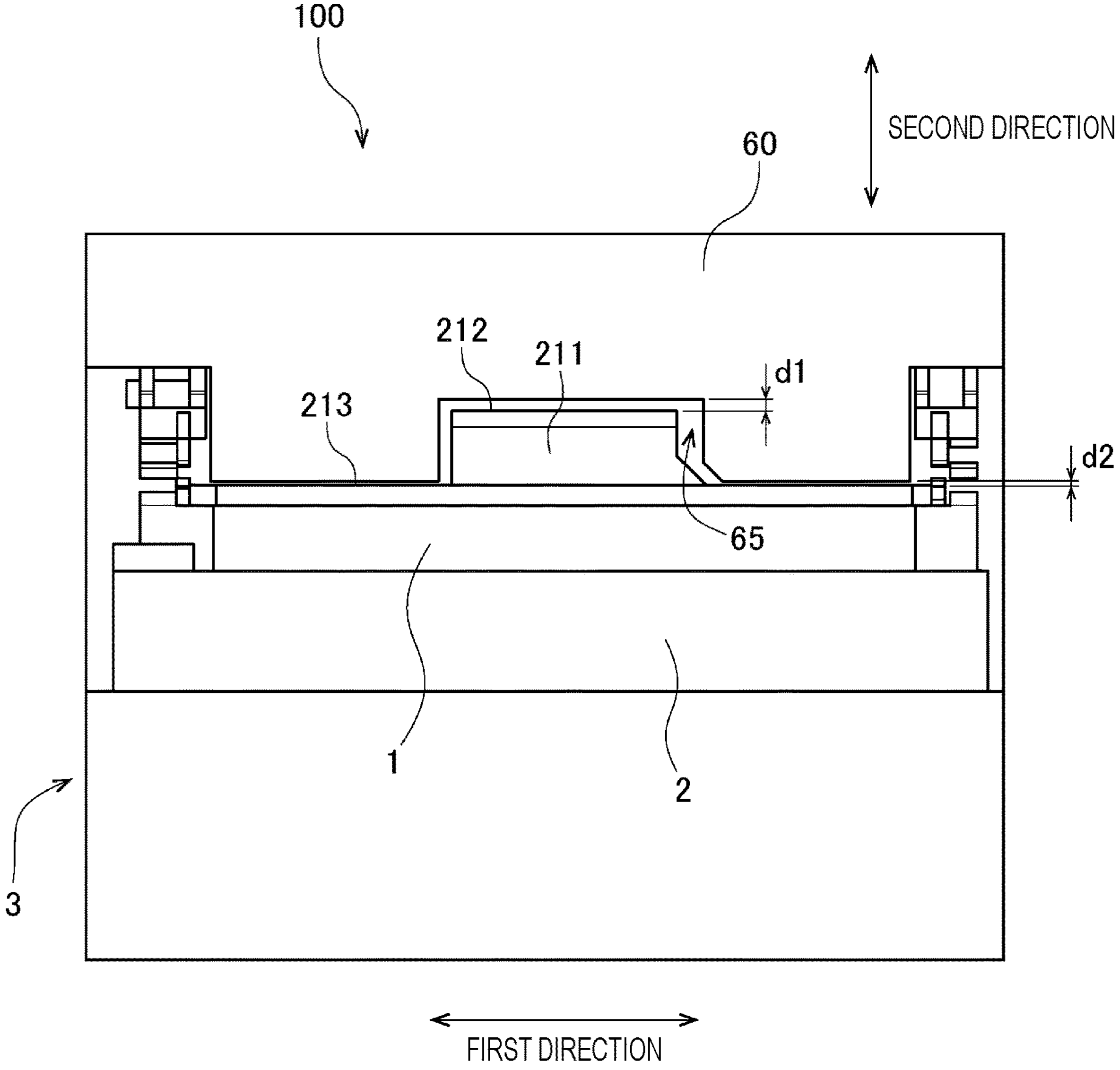
FIG. 13 is a view of the image forming apparatus seen in a third direction from an opening side, in a state in which a front cover is arranged at an open position.
Figure 14:
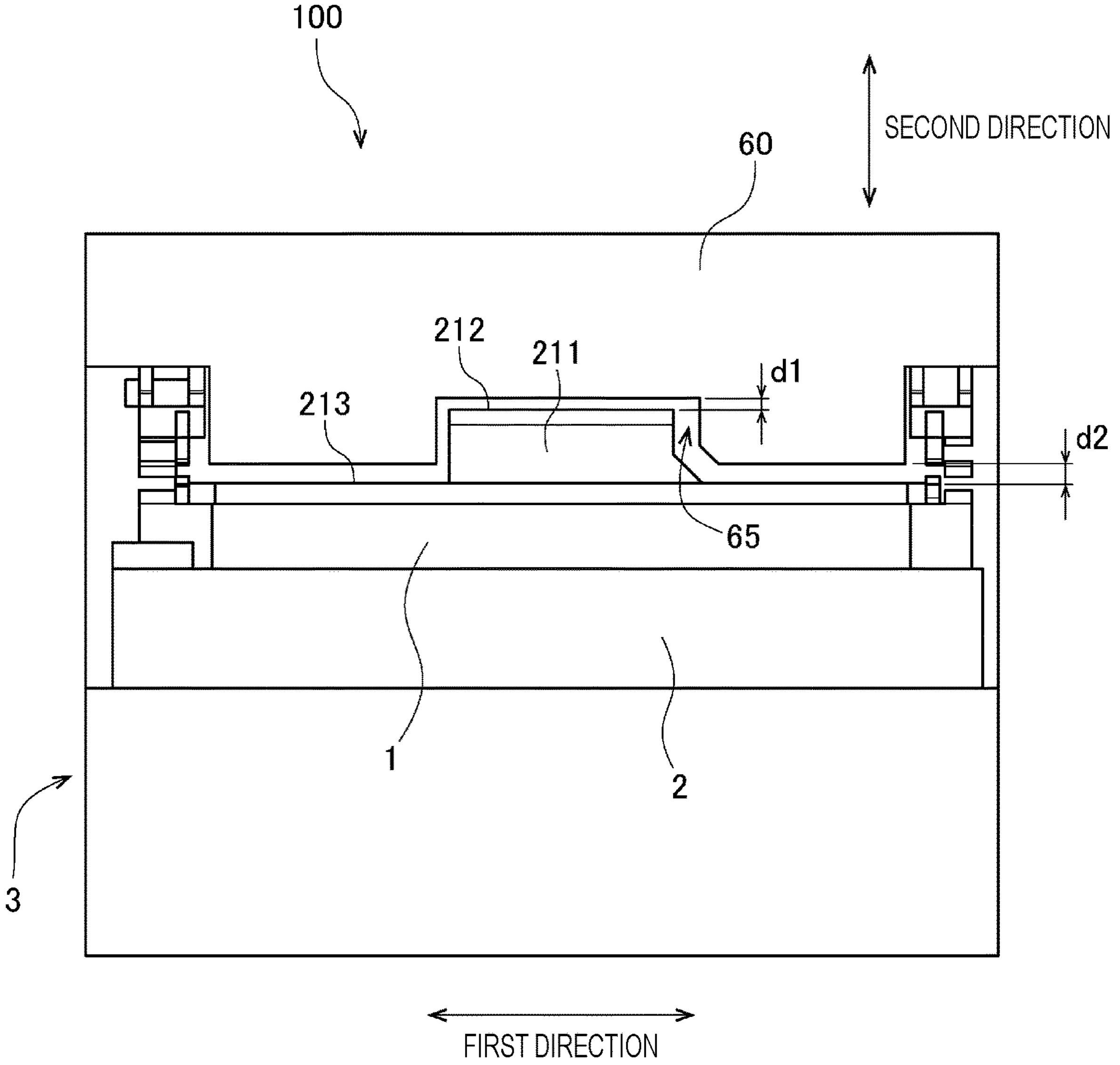
FIG. 14 is a view of the image forming apparatus seen in the third direction from the opening side, in the state in which the front cover is arranged at the open position.

FIGS. 13 and 14 are views of the image forming apparatus 100 seen in the third direction from the opening 63 side, in the state in which the front cover 61 is arranged at the open position. As shown in FIGS. 1 and 13, the body frame 60 has a concave portion 65. In the state in which the drawer 2 is mounted on the apparatus body 3, the concave portion 65 is concave in a direction away from the drawer 2 in the second direction. In a state in which the drawer 2 mounted with the process cartridges 1 is mounted on the main frame 60, the convex portion 211 of the developing frame 21 is inserted into the concave portion 65.

In the example of FIG. 13, an interval d2 in the second direction between the second surface 213 of the developing frame 21 and the body frame 60 is smaller than an interval d1 in the second direction between the first surface 212 of the developing frame 21 and the body frame 60. However, as shown in FIG. 14, the interval d2 in the second direction between the second surface 213 of the developing frame 21 and the body frame 60 may be greater than the interval d1 in the second direction between the first surface 212 of the developing frame 21 and the body frame 60.

Figure 15:
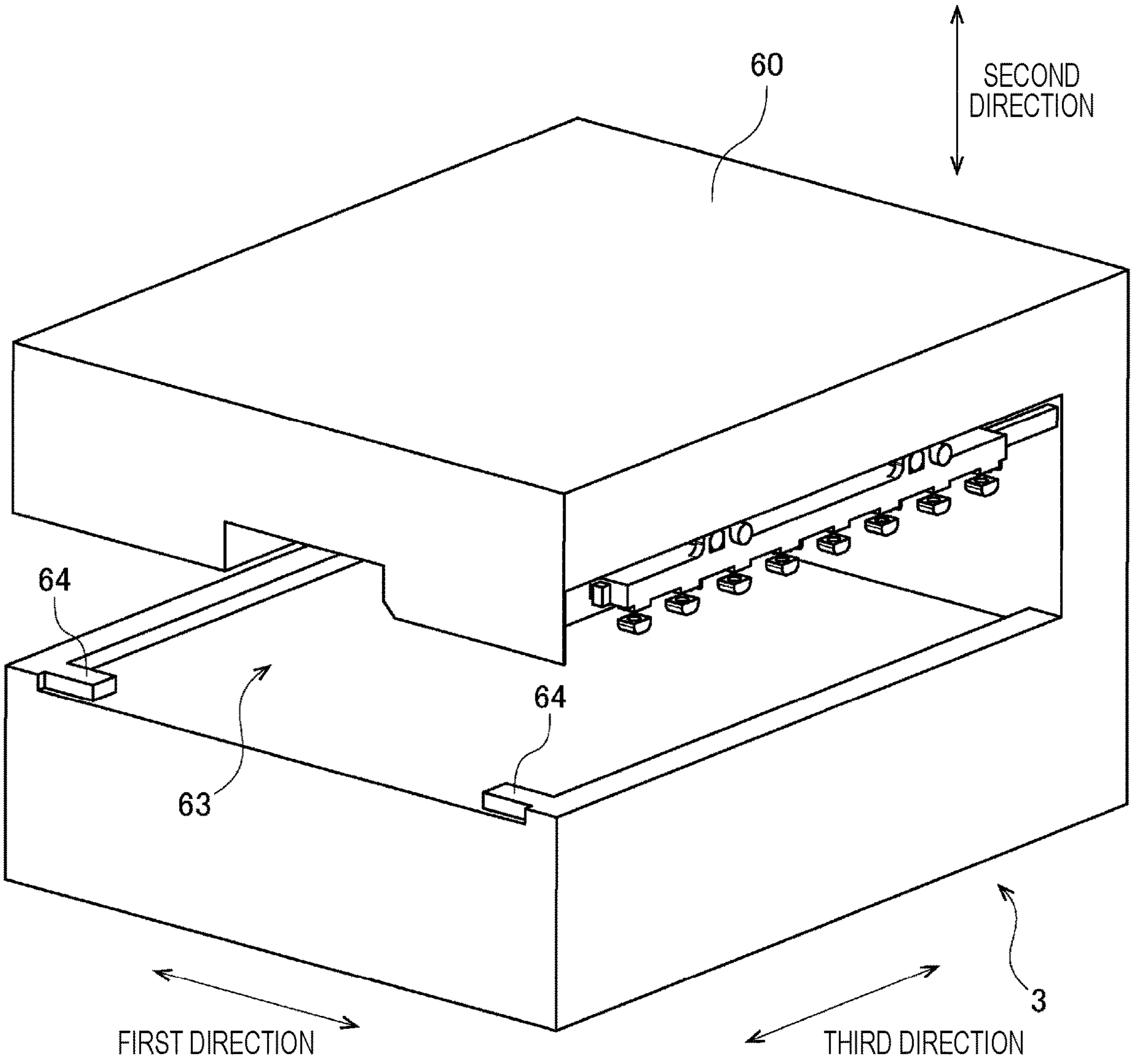
FIG. 15 is a perspective view of an apparatus body according to a modified embodiment.

FIG. 15 is a perspective view of the apparatus body 3 according to a modified embodiment. In the example of FIG. 15, the body frame 60 has a wall portion 64. In a state in which the lever 43 is arranged at the fourth position, when the drawer 2 mounted with the process cartridges 1 is moved in the third direction through the opening 63, the first end portion 431 of the lever 43 comes into contact with the wall portion 64. Thereby, in the state in which the lever 43 is arranged at the fourth position, the drawer 2 mounted with the process cartridges 1 can be prevented from being mounted on the body frame 60. In addition, in the state in which the lever 43 is arranged at the fourth position, the drawer 2 mounted with the process cartridges 1 can be prevented from being taken out from the body frame 60.

Figure 16:
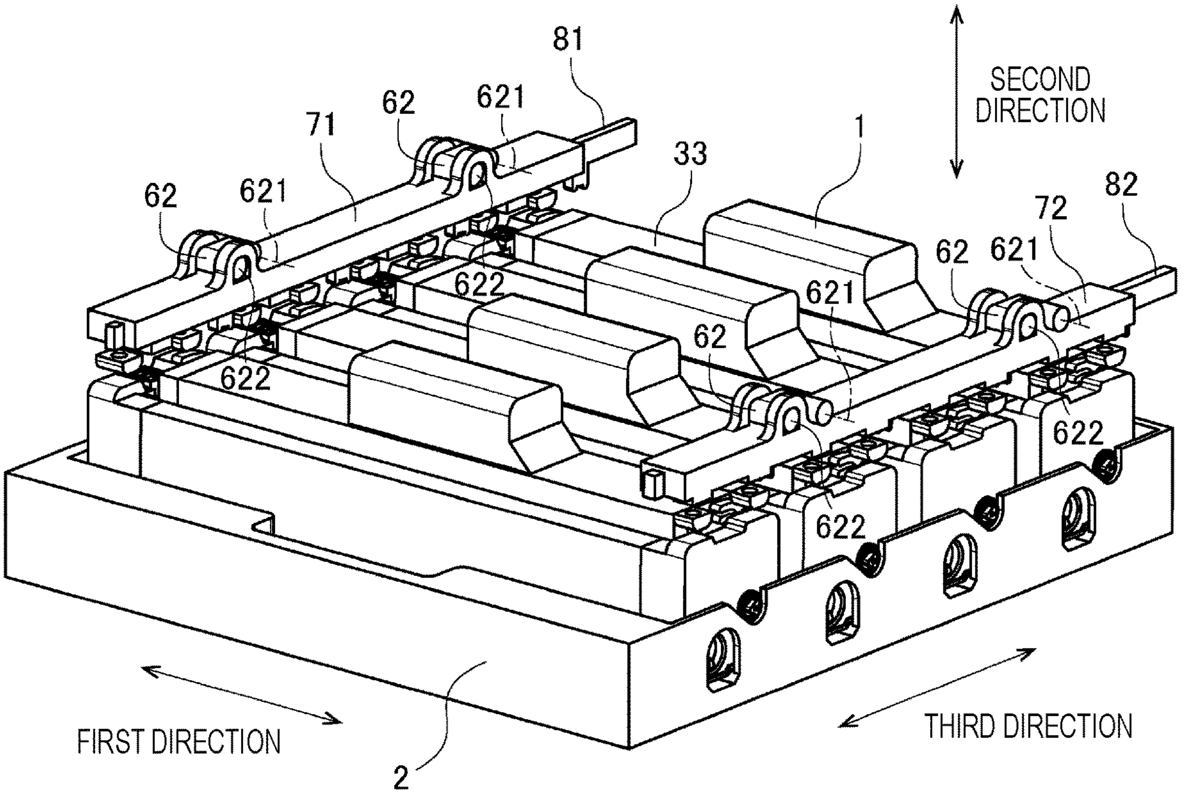
FIG. 16 is a perspective view of a drawer mounted with four process cartridges, a cam, a first moving member, a second moving member, a first lever moving member, and a second lever moving member.

FIG. 16 is a perspective view of the drawer 2 mounted with the four process cartridges 1, the cam 62, the first moving member 71, the second moving member 72, the first lever moving member 81, and the second moving member 82.

The cam 62 is a component that rotates in conjunction with the front cover 61. In the present embodiment, as shown in FIG. 16, two cams 62 are arranged at one end portion of the body frame 60 in the first direction, and two cams 62 are arranged at the other end portion of the body frame 60 in the first direction. Each cam 62 is connected to the front cover 61 via a link mechanism (not shown). When the front cover 61 rotates from the open position to the closed position, the cam 62 rotates about a cam axis 621 extending in the first direction.

In addition, the cam 62 has a cam end portion 622. The cam end portion 622 is located on a radially outer side of the cam axis 621. When the cam 62 rotates about the cam axis 621, the cam end portion 622 rotates about the cam axis 621. The cam end portion 622 has a columnar shape extending in the first direction. The cam end portion 622 of the cam 62 located at one end portion of the body frame 60 in the first direction is in contact with the first moving member 71 in the second direction. The cam end portion 622 of the cam 62 located at the other end portion of the body frame 60 in the first direction is in contact with the second moving member 72 in the second direction.

The first moving member 71 is a member that is movable in the second direction in response to the rotation of the cam 62. The first moving member 71 is located at one end of the body frame 1 in the first direction. A shape of the first moving member 71 is a beam shape extending in the third direction. That is, a length of the first moving member 71 in the third direction is longer than a length of the first moving member 71 in the first direction and a length of the first moving member 71 in the second direction. The first moving member 71 is supported by two cams 62. In the state in which the drawer 2 mounted with the process cartridges 1 is mounted on the apparatus body 3, the first moving member 71 faces the four process frames 33 in the second direction.

The first moving member 71 has two cam holes 710. The two cam holes 710 are aligned at an interval in the third direction. The cam hole 710 is a circular hole that penetrates through the first moving member 71 in the first direction. The cam end portion 622 of the cam 62 located at one end portion of the body frame 60 in the first direction is inserted into the cam hole 710. Thereby, the cam 62 and the first moving member 71 are connected.

The first moving member 71 is movable in the second direction with respect to the process frame 33 between a fifth position and a sixth position closer to the process frame 33 than the fifth position. In a state in which the front cover 61 is arranged at the open position, the first moving member 71 is arranged at the fifth position. When the front cover 61 rotates from the open position to the closed position, the cam 62 rotates about the cam axis 621. Then, the cam end portion 622 rotates about the cam axis 621 to push the first moving member 71 toward the drawer 2 in the second direction. Thereby, the first moving member 71 is moved from the fifth position to the sixth position.

Note that a movement distance in the second direction of the first moving member 71 from the fifth position to the sixth position is greater than a movement distance in the second direction of the lever 43 from the third position to the fourth position.

Figure 17:
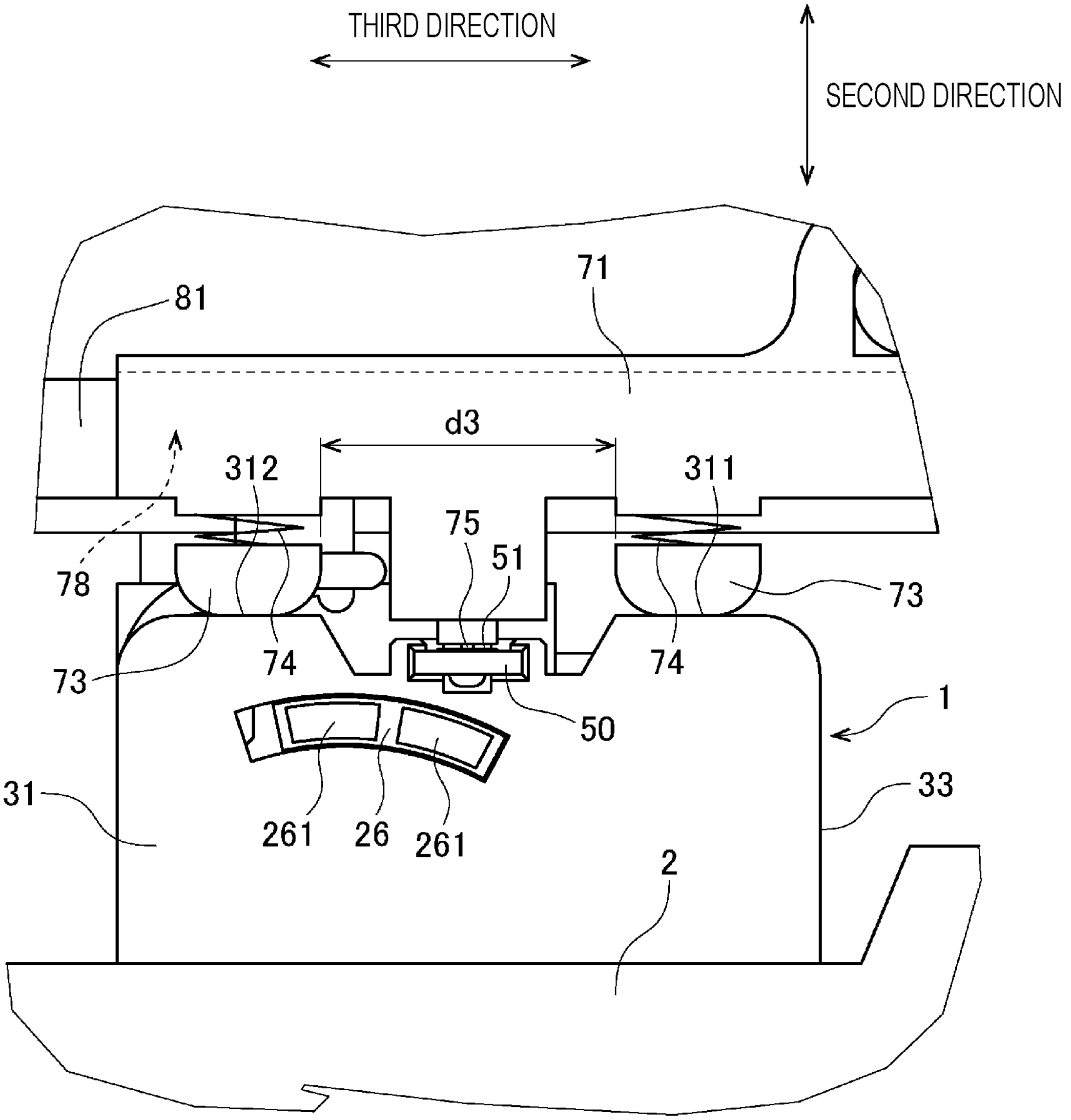
FIG. 17 is a view of a part of the first moving member seen in the first direction.

FIG. 17 is a view of a part of the first moving member 71 seen in the first direction. As shown in FIG. 17, the first moving member 71 includes a pressing part 73 and an urging member 74 (first urging member). The pressing part 73 is connected to the first moving member 71 via the urging member 74. The urging member 74 is a spring that is stretchable in the second direction. One end of the urging member 74 in the second direction is connected to the pressing part 73. The other end of the urging member 74 in the second direction is connected to the first moving member 71.

In a state in which the first moving member 71 is arranged at the fifth position, the pressing part 73 is separated from the process frame 33 in the second direction. In a state in which the first moving member 71 is arranged at the sixth position, the pressing part 73 is in contact with the process frame 33. Specifically, the pressing part 73 is in contact with the first side cover 31. Then, the pressing part 73 comes into contact with the process frame 33, so that the process frame 33 is pressed toward the drawer 2. That is, the first moving member 71 is moved from the fifth position to the sixth position, so that the pressing part 73 comes into contact with the process frame 33 and presses the process frame 33 toward the drawer 2. Thereby, the process cartridge 1 is positioned with respect to the drawer 2.

In the state in which the first moving member 71 is arranged at the sixth position, the urging member 74 urges the pressing part 73 toward the drawer 2. Thereby, the pressing part 73 can press the process frame 33 with appropriate pressing force.

As shown in FIG. 17, the first moving member 71 has an electrical contact 75. The electrical contact 75 is electrically connected to a control unit of the image forming apparatus 100. As shown in FIG. 17, in the state in which the first moving member 71 is arranged at the sixth position, the electrical contact 75 is in contact with the electrical contact surface 51 of the memory 50. Thereby, the memory 50 is electrically connected to the control unit. As a result, the control unit can perform at least one of reading information from the memory 50 and writing information into the memory 50.

As shown in FIG. 17, the first moving member 71 has two pressing parts 73 with respect to one process frame 33. The two pressing parts 73 are located on both sides of the electrical contact 75 in the third direction. The two pressing parts 73 and the electrical contact 75 are located in the same plane perpendicular to the first direction. One of the two pressing parts 73 is in contact with the first convex surface 311. The other of the two pressing parts 73 is in contact with the second convex surface 312. As such, the pressing parts 73 press the process frame 33 on both sides of the electrical contact surface 51 in the third direction. Thereby, the electrical contact surface 51 located between the two pressing parts 73 can be positioned with high precision.

Figure 18:
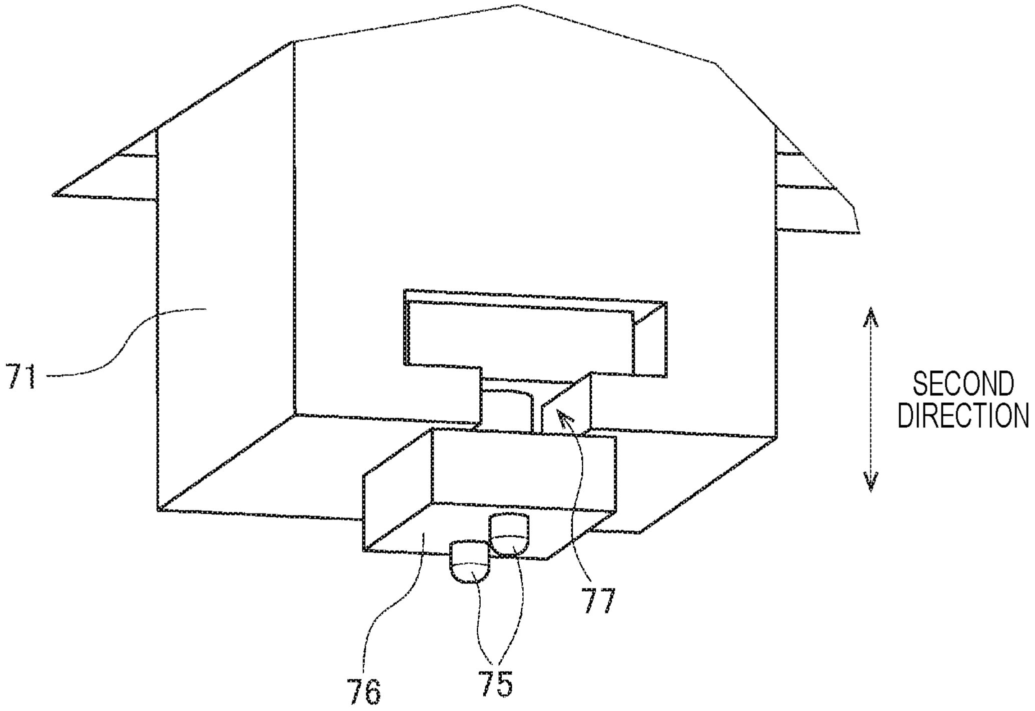
FIG. 18 is a partial perspective view of the first moving member in the vicinity of an electrical contact.

FIG. 18 is a partial perspective view of the first moving member 71 in the vicinity of the electrical contact 75. As shown in FIG. 18, the first moving member 71 includes a holder 76 that holds the electrical contact 75. In addition, the first moving member 71 has a retaining groove 77 extending in a direction intersecting the second direction. The retaining groove 77 extends, for example, in the third direction. The holder 76 is held by the first moving member 71 in a state in which it is movable along the retaining groove 77. With such a configuration, the electrical contact 75 becomes movable with respect to the first moving member 71 in a direction intersecting the second direction. Therefore, when the first moving member 71 moves from the fifth position to the sixth position, the electrical contact 75 can be positioned with high precision with respect to the electrical contact surface 51.

The second moving member 72 is a member that is movable in the second direction in response to the rotation of the cam 62. The second moving member 72 is located at the other end of the body frame 2 in the first direction. A shape of the second moving member 72 is a beam shape extending in the third direction. That is, a length of the second moving member 72 in the third direction is longer than a length of the second moving member 72 in the first direction and a length of the second moving member 72 in the second direction. The second moving member 72 is supported by two cams 62. In the state in which the drawer 2 mounted with the process cartridges 1 is mounted on the apparatus body 3, the second moving member 72 faces the four process frames 33 in the second direction.

The second moving member 72 has two cam holes 720. The two cam holes 720 are aligned at an interval in the third direction. The cam hole 720 is a circular hole that penetrates through the second moving member 72 in the first direction. The cam end portion 622 of the cam 62 located at the other end portion of the body frame 60 in the first direction is inserted into the cam hole 720. Thereby, the cam 62 and the second moving member 72 are connected.

The second moving member 72 is movable in the second direction with respect to the process frame 33 between the fifth position and the sixth position closer to the process frame 33 than the fifth position. In a state in which the front cover 61 is arranged at the open position, the second moving member 72 is arranged at the fifth position. When the front cover 61 rotates from the open position to the closed position, the cam 62 rotates about the cam axis 621. Then, the cam end portion 622 rotates about the cam axis 621 to push the second moving member 72 toward the drawer 2 in the second direction. Thereby, the second moving member 72 is moved from the fifth position to the sixth position.

Figure 19:
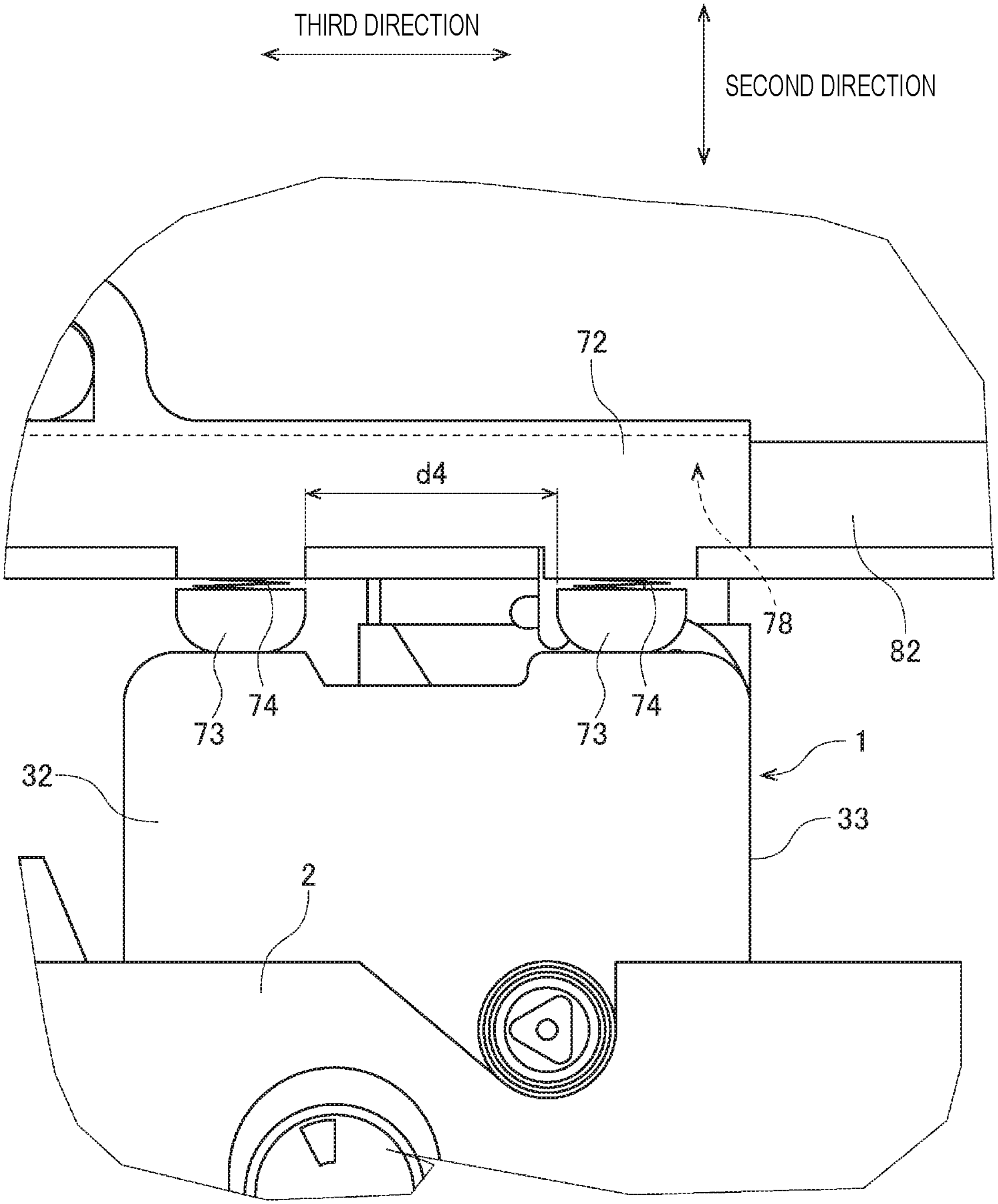
FIG. 19 is a view of a part of the second moving member seen in the first direction.

FIG. 19 is a view of a part of the second moving member 72 seen in the first direction. As shown in FIG. 19, the second moving member 72 includes a pressing part 73 and an urging member 74 (second urging member). The pressing part 73 is connected to the second moving member 72 via the urging member 74. The urging member 74 is a spring that is stretchable in the second direction. One end of the urging member 74 in the second direction is connected to the pressing part 73. The other end of the urging member 74 in the second direction is connected to the second moving member 72.

In a state in which the second moving member 72 is arranged at the fifth position, the pressing part 73 is separated from the process frame 33 in the second direction. In a state in which the second moving member 72 is arranged at the sixth position, the pressing part 73 is in contact with the process frame 33. Specifically, the pressing part 73 is in contact with the second side cover 32. Then, the pressing part 73 comes into contact with the process frame 33, so that the process frame 33 is pressed toward the drawer 2. That is, the second moving member 72 is moved from the fifth position to the sixth position, so that the pressing part 73 comes into contact with the process frame 33 and presses the process frame 33 toward the drawer 2. Thereby, the process cartridge 1 is positioned with respect to the drawer 2.

In the state in which the second moving member 72 is arranged at the sixth position, the urging member 74 urges the pressing part 73 toward the drawer 2. Thereby, the pressing part 73 can press the process frame 33 with appropriate pressing force. Note that the electrical contact 75 of the first moving member 71 has an urging force in the second direction. For this reason, the urging force of the urging member 74 (first urging member) of the first moving member 71 may be less than the urging force of the urging member 74 (second urging member) of the second moving member 72.

As shown in FIG. 19, the second moving member 72 has two pressing parts 73 with respect to one process frame 33. As shown in FIGS. 17 and 19, an interval d4 in the third direction between the two pressing parts 73 of the second moving member 72 is smaller than an interval d3 in the third direction between the two pressing parts 73 of the first moving member 71. In this way, by widening the interval d3 in the third direction between the two pressing parts 73 of the first moving member 71, the electrical contact 75 can be positioned with higher precision with respect to the electrical contact surface 51. In addition, the second moving member 72 may have one pressing part 73 with respect to one process frame 33.

The first lever moving member 81 is a member for moving the lever 43 of the separation holding mechanism 40. The first lever moving member 81 is located at one end of the body frame 1 in the first direction. A shape of the first lever moving member 81 is an elongated plate shape extending in the third direction. That is, a length of the first lever moving member 81 in the third direction is longer than a length of the first lever moving member 81 in the first direction and a length of the first lever moving member 81 in the second direction. In addition, the length of the first lever moving member 81 in the first direction is shorter than the length of the first lever moving member 81 in the second direction. The first moving member 71 has a guide groove 78 extending in the third direction. The first lever moving member 81 is arranged in the guide groove 78.

The first lever moving member 81 is movable in the second direction together with the first moving member 71. That is, the first lever moving member 81 moves in the second direction along with the first moving member 71 when the first moving member 71 moves in the second direction. Additionally, the first lever moving member 81 is movable in the third direction with respect to the first moving member 71 along the guide groove 78.

Figure 20:
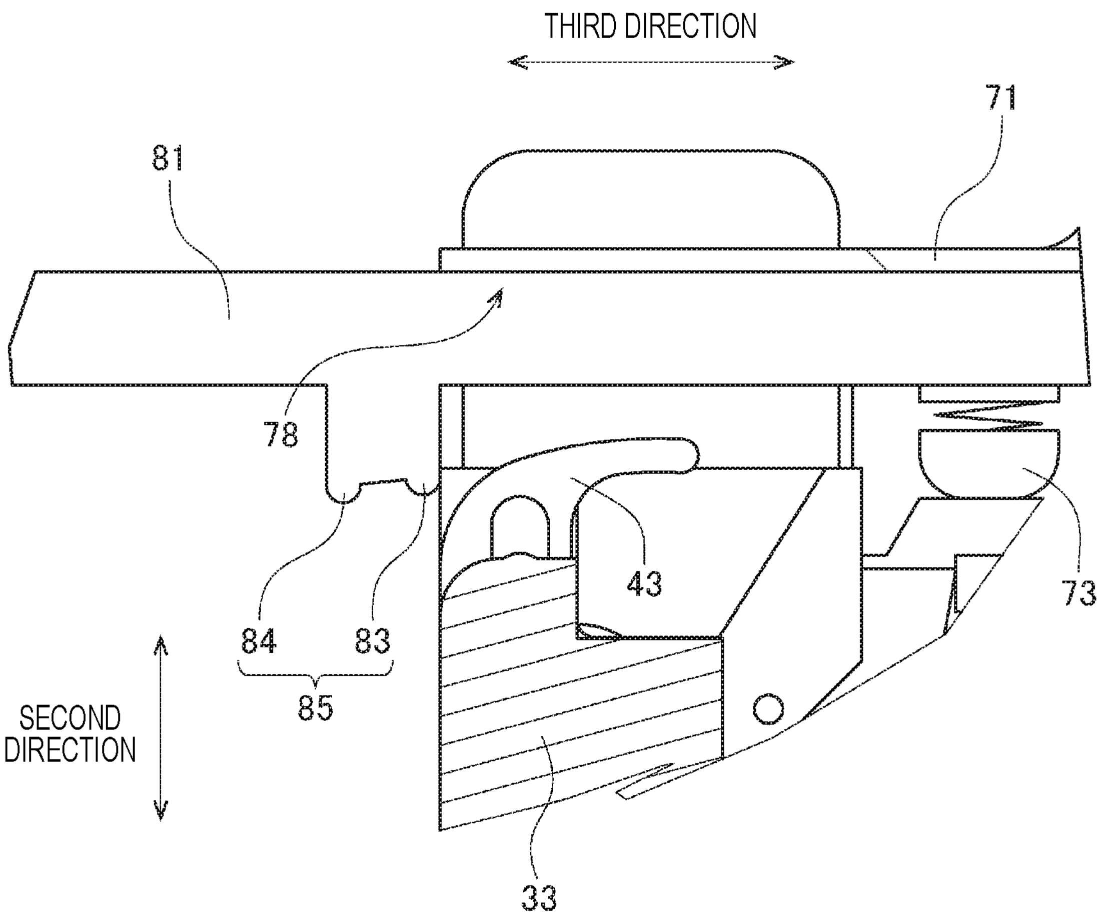
FIG. 20 is a view of a part of the first lever moving member seen in the first direction.
Figure 21:
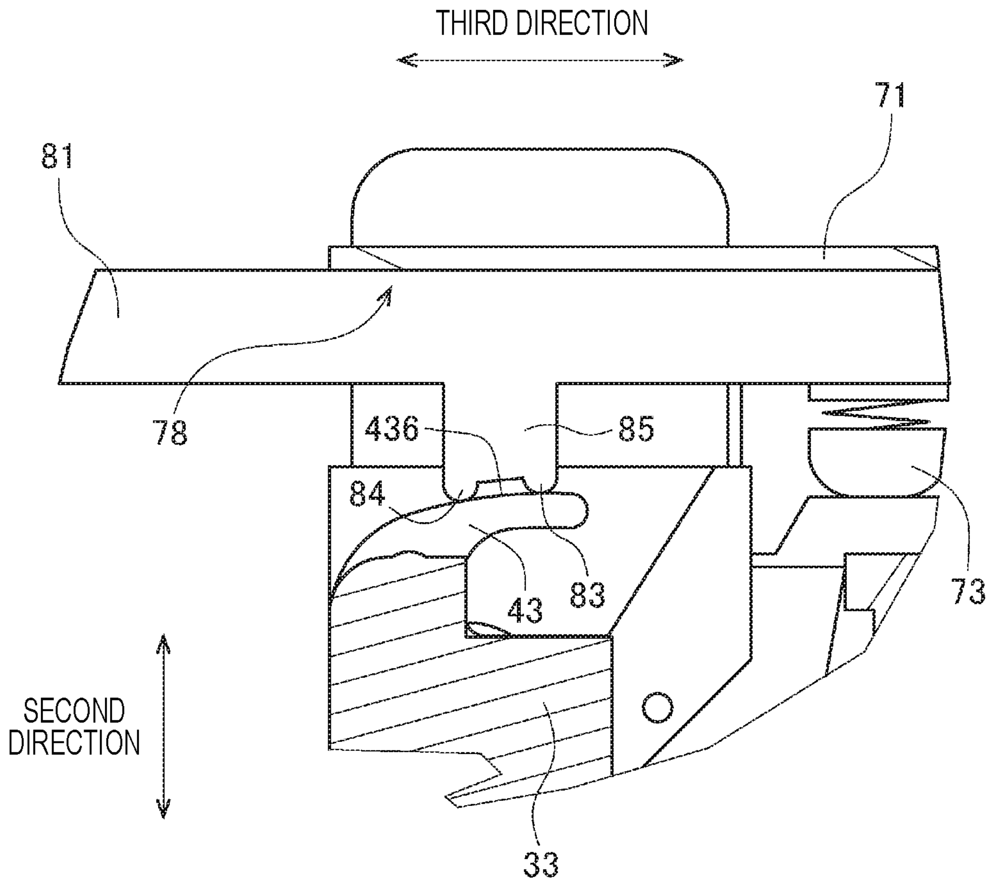
FIG. 21 is a view of a part of the first lever moving member seen in the first direction.

FIGS. 20 and 21 are views of a part of the first lever moving member 81 seen in the first direction. As shown in FIGS. 20 and 21, the first lever moving member 81 has a contact part 85. The contact part 85 protrudes from the first lever moving member 81 toward the process frame 33 in the second direction. That is, the contact part 85 protrudes from the first lever moving member 81 toward the drawer 2 in the second direction.

The contact part 85 includes a first contact portion 83 and a second contact portion 84. The first contact portion 83 and the second contact portion 84 are separated from each other in the third direction. The second contact portion 84 is located at a position farther separated from the front cover 61 than the first contact portion 83 in the third direction. Additionally, the second contact portion 84 is located closer to the drawer 2 than the first contact portion 83 in the second direction.

Figure 22:
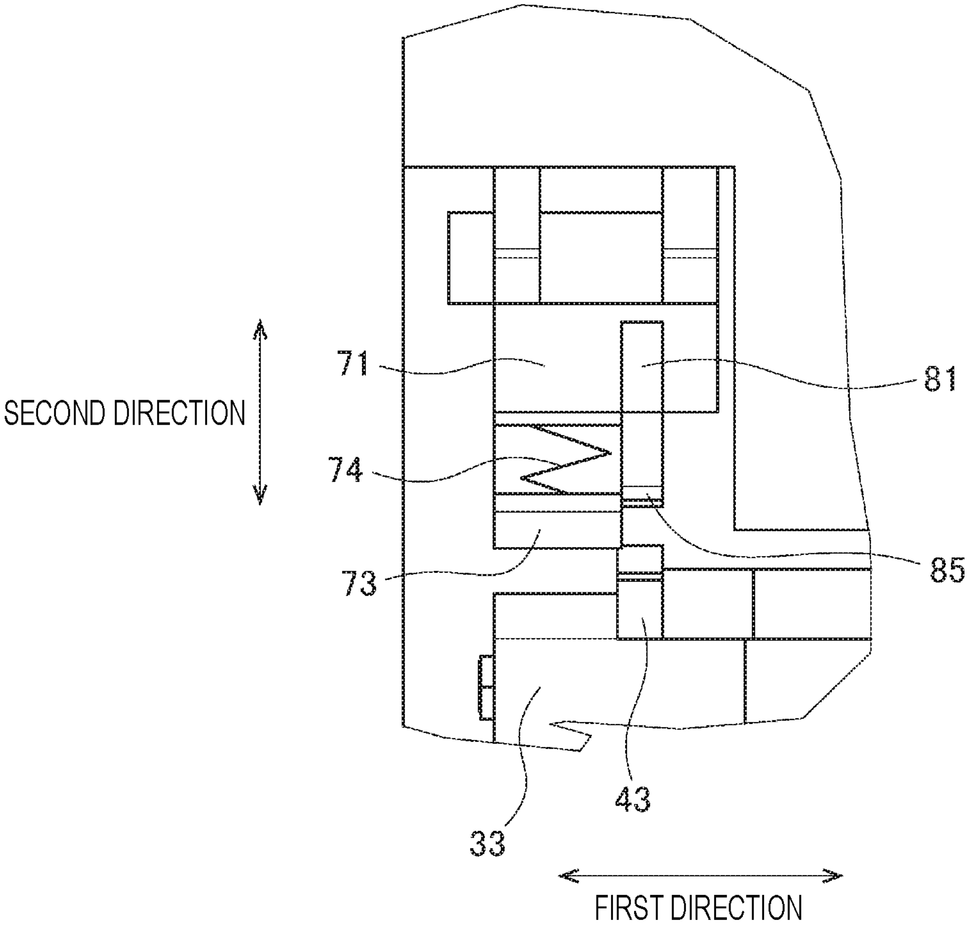
FIG. 22 is a view of the vicinity of the first moving member and the first lever moving member seen in the third direction.

FIG. 22 is a view of the vicinity of the first moving member 71 and the first lever moving member 81 seen in the third direction. As shown in FIG. 22, the pressing part 73 of the first moving member 71 is located at a position closer to one end of the process frame 33 in the first direction than the contact part 85 of the first lever moving member 81. That is, in the first direction, the pressing part 73 is located outside the contact part 85.

The image forming apparatus 100 can move the first lever moving member 81 from a seventh position shown in FIG. 20 to an eighth position shown in FIG. 21 in a state in which the first moving member 71 is arranged at the sixth position. The eighth position is a position closer to the front cover 61 than the seventh position in the third direction.

In a state in which the first lever moving member 81 is arranged at the seventh position, the contact part 85 is not in contact with the lever 43 of the process cartridge 1. When the image forming apparatus 100 moves the first lever moving member 81 from the seventh position to the eighth position, the contact part 85 comes into contact with the lever 43. More specifically, the first contact portion 83 and the second contact portion 84 come into contact with the contacted surface 436 of the lever 43. Thereby, the first contact portion 83 and the second contact portion 84 press the lever 43 toward the drawer 2 in the second direction. As a result, the lever 43 is moved from the third position to the fourth position.

The second lever moving member 82 is a member for moving the lever 43 of the separation holding mechanism 40. The second lever moving member 82 is located at the other end of the body frame 60 in the first direction. A shape of the second lever moving member 82 is an elongated plate shape extending in the third direction. That is, a length of the second lever moving member 82 in the third direction is longer than a length of the second lever moving member 82 in the first direction and a length of the second lever moving member 82 in the second direction. In addition, the length of the second lever moving member 82 in the first direction is shorter than the length of the second lever moving member 82 in the second direction. The second moving member 72 has a guide groove 78 extending in the third direction. The second lever moving member 82 is arranged in the guide groove 78.

The second lever moving member 82 is movable in the second direction together with the second moving member 72. That is, the second lever moving member 82 can move in the second direction along with the second moving member 72 when the second moving member 72 moves in the second direction. Additionally, the second lever moving member 82 is movable in the third direction with respect to the second moving member 72 along the guide groove 78.

Similar to the first lever moving member 81, the second lever moving member 82 also has a contact part 85. The contact part 85 protrudes from the second lever moving member 82 toward the process frame 33 in the second direction. That is, the contact part 85 protrudes from the second lever moving member 82 toward the drawer 2 in the second direction.

The contact part 85 includes a first contact portion 83 and a second contact portion 84. The first contact portion 83 and the second contact portion 84 are separated from each other in the third direction. The second contact portion 84 is located at a position farther separated from the front cover 61 than the first contact portion 83 in the third direction. Additionally, the second contact portion 84 is located closer to the drawer 2 than the first contact portion 83 in the second direction.

Figure 23:
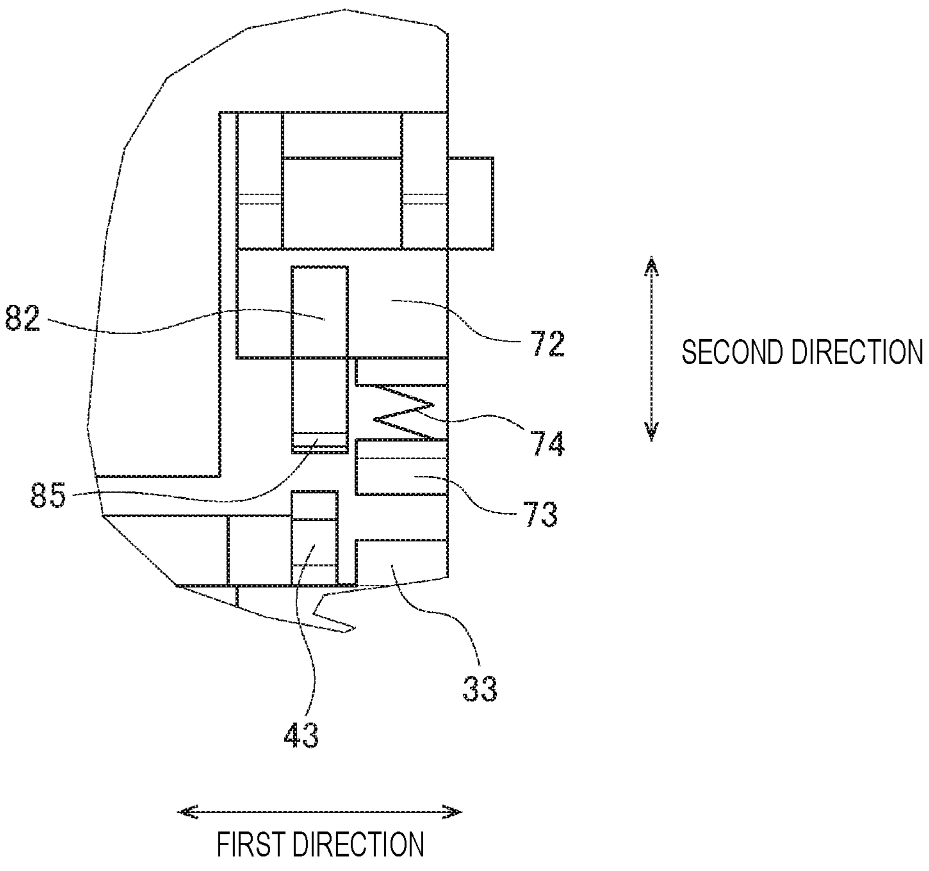
FIG. 23 is a view of the vicinity of the second moving member and the second lever moving member seen in the third direction.

FIG. 23 is a view of the vicinity of the second moving member 72 and the second lever moving member 82 seen in the third direction. As shown in FIG. 23, the pressing part 73 of the second moving member 72 is located at a position closer to the other end of the process frame 33 in the first direction than the contact part 85 of the second lever moving member 82. That is, in the first direction, the pressing part 73 is located outside the contact part 85.

The image forming apparatus 100 can move the second lever moving member 82 from the seventh position to the eighth position in a state in which the second moving member 72 is arranged at the sixth position. The eighth position is a position closer to the front cover 61 than the seventh position in the third direction.

In a state in which the first lever moving member 82 is arranged at the seventh position, the contact part 85 is not in contact with the lever 43 of the process cartridge 2. When the image forming apparatus 100 moves the second lever moving member 82 from the seventh position to the eighth position, the contact part 85 comes into contact with the lever 43. More specifically, the first contact portion 83 and the second contact portion 84 come into contact with the contacted surface 436 of the lever 43. Thereby, the first contact portion 83 and the second contact portion 84 press the lever 43 toward the drawer 2 in the second direction. As a result, the lever 43 is moved from the third position to the fourth position.

Figure 24:
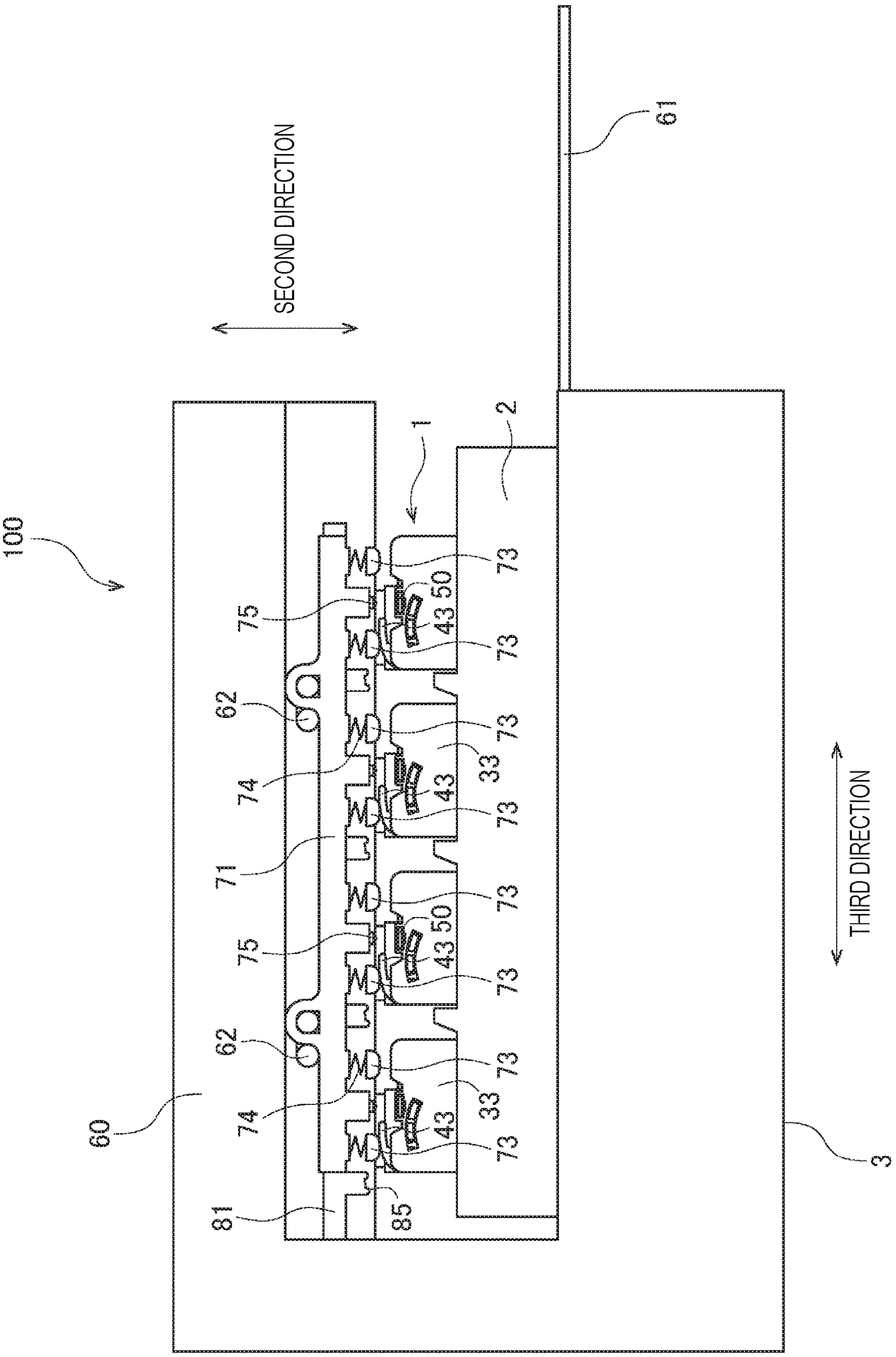
FIG. 24 is a view showing an aspect in which the drawer mounted with the process cartridges is being mounted on the apparatus body.
Figure 25:
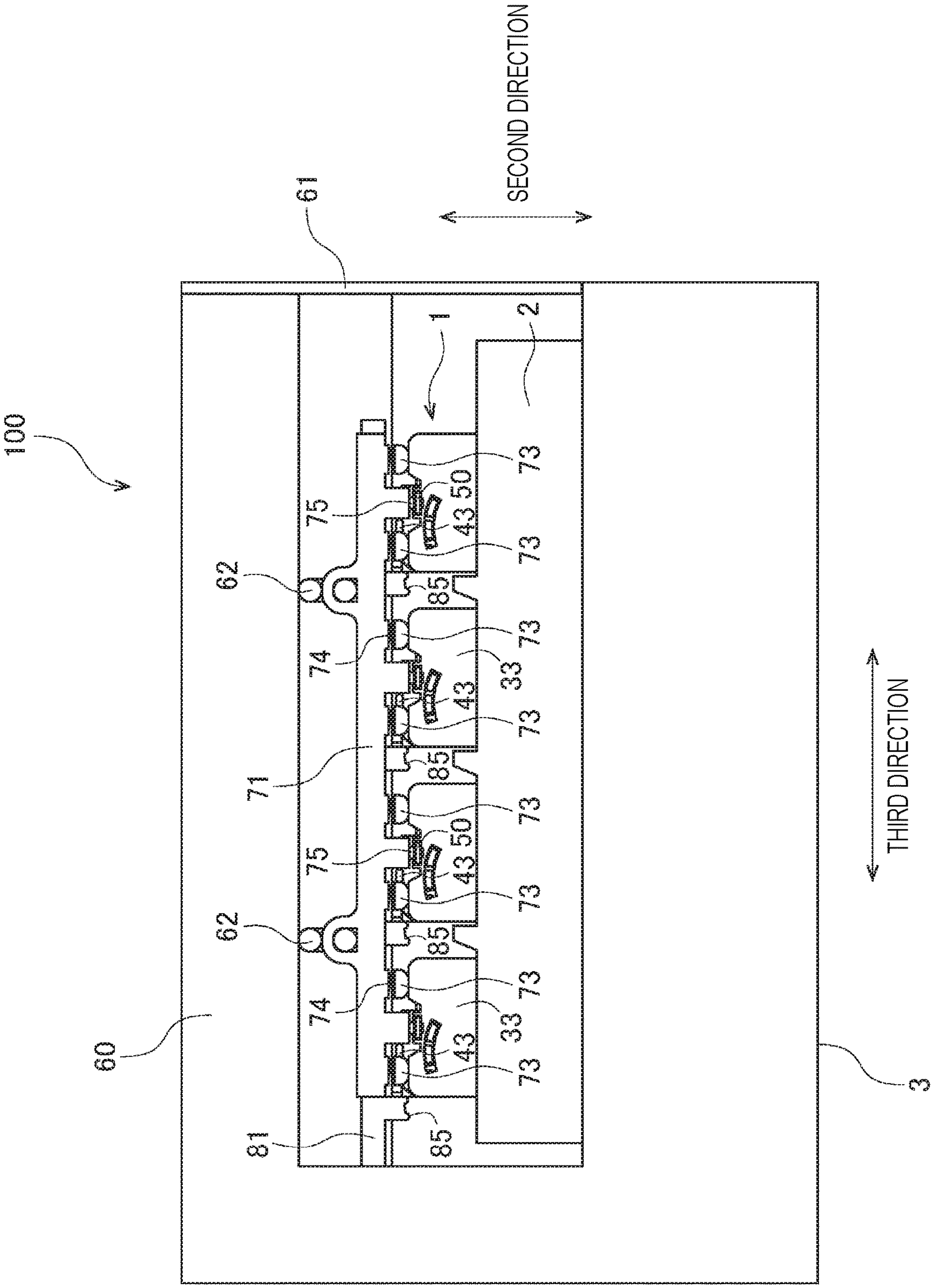
FIG. 25 is a view showing an aspect in which the drawer mounted with the process cartridges is being mounted on the apparatus body.
Figure 26:
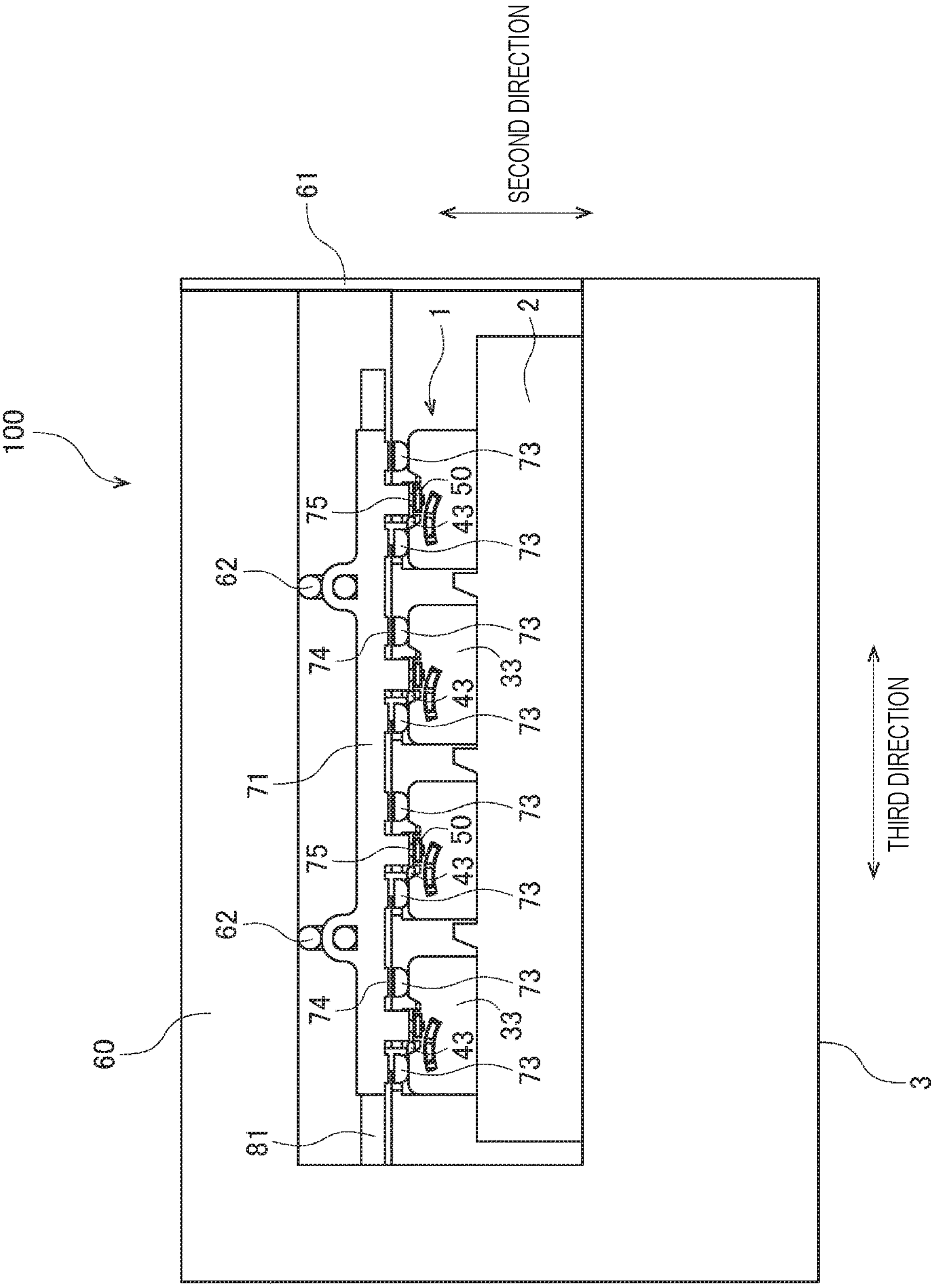
FIG. 26 is a view showing an aspect in which the drawer mounted with the process cartridges is being mounted on the apparatus body.

FIGS. 24 to 26 are views showing an aspect in which the drawer 2 mounted with the process cartridges 1 is being mounted on the apparatus body 3. When mounting the drawer 2 mounted with the process cartridges 1 on the apparatus body 3, first, the front cover 61 of the apparatus body 3 is opened. That is, the front cover 61 rotates from the closed position to the open position. Then, the drawer 2 mounted with the process cartridges 1 is mounted on the body frame 60. That is, the drawer 2 mounted with the process cartridges 1 is moved from the second position to the first position in the third direction. Thereby, the drawer 2 mounted with the process cartridges 1 is arranged inside the body frame 60 (state in FIG. 24).

At this time point, the first moving member 71 and the second moving member 72 are located at the fifth position. Additionally, the first lever moving member 81 and the second lever moving member 82 are located at the seventh position. Additionally, the lever 43 of the process cartridge 1 is located at the third position.

Next, the front cover 61 is closed. That is, the front cover 61 rotates from the open position to the closed position. Then, the cam 62 rotates along with the rotation of the front cover 61. The rotation of the cam 62 moves the first moving member 71 and the second moving member 72 from the fifth position to the sixth position. Thereby, the pressing part 73 comes into contact with the process frame 33, and the electrical contact 75 comes into contact with the electrical contact surface 51 of the memory 50 (state in FIG. 25).

During the process in which the first moving member 71 is moved from the fifth position to the sixth position, first, the pressing part 73 comes into contact with the process frame 33. Thereafter, in the state in which the pressing part 73 is in contact with the process frame 33, the electrical contact 75 comes into contact with the electrical contact surface 51. For this reason, in a state in which the process frame 33 is positioned with respect to the drawer 2, the electrical contact 75 can be brought into contact with the electrical contact surface 51.

Subsequently, the image forming apparatus 100 moves the first lever moving member 81 and the second lever moving member 82 from the seventh position to the eighth position in the third direction. Then, the contact part 85 comes into contact with the lever 43. More specifically, the first contact portion 83 and the second contact portion 84 come into contact with the contacted surface 436 of the lever 43. Thereby, the first contact portion 83 and the second contact portion 84 press the lever 43 toward the drawer 2 in the second direction. As a result, the lever 43 is moved from the third position to the fourth position (state in FIG. 26).

As described above, the contact part 85 comes into contact with the lever 43 in the state in which the pressing part 73 is in contact with the process frame 33. With such a configuration, the lever 43 can be moved from the third position to the fourth position in the state in which the process frame 33 is positioned with respect to the body frame 60. In particular, in the present embodiment, after the pressing part 73 comes into contact with the process frame 33, the contact part 85 comes into contact with the lever 43. Thereby, after the process frame 33 is positioned with respect to the body frame 60, the lever 43 can be moved from the third position to the fourth position.

Additionally, the contact part 85 comes into contact with the lever 43 in the state in which the electrical contact 75 is in contact with the electrical contact surface 51 of the memory 50. With such a configuration, the lever 43 can be moved from the third position to the fourth position in the state in which the electrical contact 75 is positioned with respect to the electrical contact surface 51. In particular, in the present embodiment, after the electrical contact 75 comes into contact with the electrical contact surface 51 of the memory 50, the contact part 85 comes into contact with the lever 43. Thereby, after the electrical contact 75 is positioned with respect to the electrical contact surface 51, the lever 43 can be moved from the third position to the fourth position.

As shown in FIGS. 24 and 25, the first lever moving member 81 has four contact parts 85. When the first lever moving member 81 moves from the seventh position to the eighth position, the contact parts 85 come into contact with the respective levers 43 of the four process cartridges 1. With such a configuration, each lever 43 of the four process cartridges 1 can be moved from the third position to the fourth position simply by moving one first lever moving member 81 from the third position to the fourth position.

Similarly, the second lever moving member 82 also has four contact parts 85. When the first lever moving member 82 moves from the seventh position to the eighth position, the contact parts 85 come into contact with the respective levers 43 of the four process cartridges 2. With such a configuration, each lever 43 of the four process cartridges 2 can be moved from the third position to the fourth position simply by moving one first lever moving member 82 from the third position to the fourth position.

When the lever 43 is arranged at the fourth position, the lever projection 435 protrudes from the process frame 33 toward the drawer 2 in the second direction, as shown in FIG. 11. The image forming apparatus 100 pushes the lever projection 435 toward the photoconductor drum 12 in the third direction, as shown by the broken line arrow in FIG. 12. Thereby, the first end portion 431 of the lever 43 is moved toward the photoconductor drum 12 in the third direction. Then, the lever 43 presses the lock projection 423, and the lock projection 423 together with the lever hole 434 is also tilted toward the photoconductor drum 12 in the third direction. As a result, the lock member 42 rotates about one end 421 from the lock position shown in FIG. 11 to the release position shown in FIG. 12.

Then, when the lock member 42 is arranged at the release position, the developing roller 23 is moved in the third direction toward the photoconductor drum 12 by the urging force of the first elastic member 41. As a result, the developing roller 23 comes into contact with the photoconductor drum 12. That is, the developing roller 23 moves from the separated position to the contact position.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

5. MODIFIED EMBODIMENTS

Although the embodiments of the present disclosure have been described above, the present disclosure is not limited to the above embodiments.

5-1. First Modified Embodiment

Figure 27:
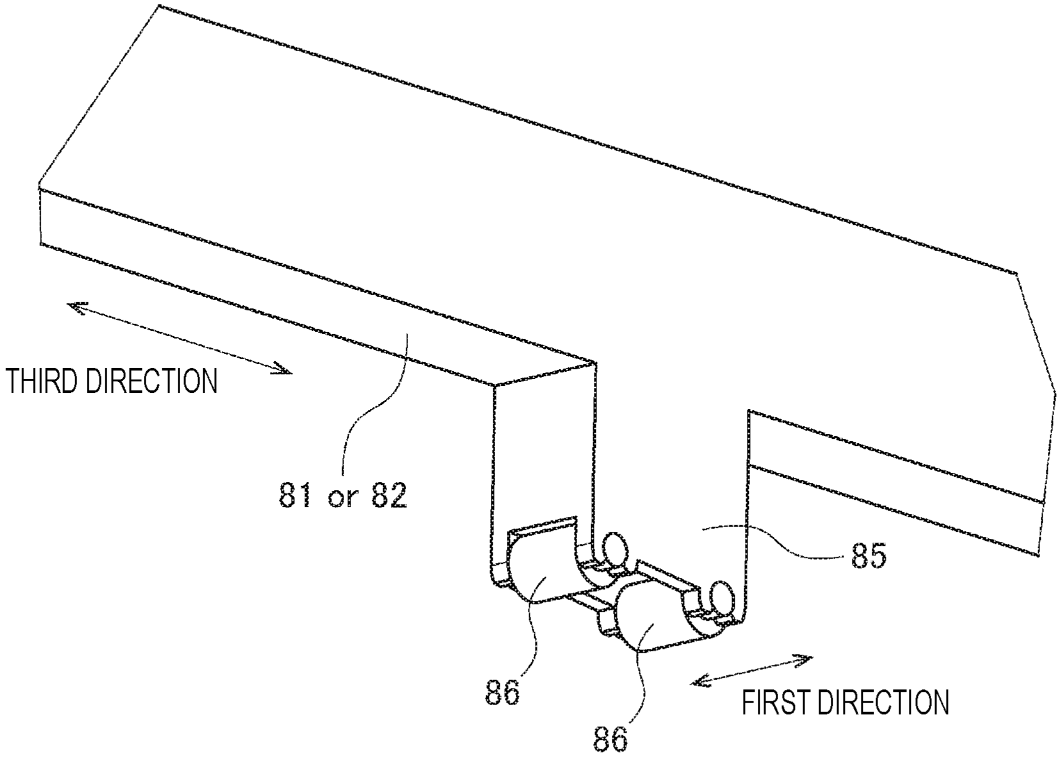
FIG. 27 is a perspective view of a contact part in a modified embodiment.

FIG. 27 is a perspective view of the contact part 85 in one modified embodiment. In the above embodiment, the outer surface of the contact part 85 is brought into contact with the lever 43. In contrast, in the example of FIG. 27, the contact part 85 has a guide roller 86. The guide roller 86 rotates about an axis extending in the first direction. When the first lever moving member 81 or the second lever moving member 82 moves from the seventh position to the eighth position, the guide roller 86 comes into contact with the lever 43. Thereby, the guide roller 86 presses the lever 43 toward the drawer 2 in the second direction. As a result, the lever 43 is moved from the third position to the fourth position. At this time, the guide roller 86 rotates while contacting the lever 43. Thereby, resistance due to friction between the lever 43 and the contact part 85 can be reduced.

5-2. Second Modified Embodiment

In the above embodiment, the first lever moving member 81 and the second lever moving member 82 each have the contact part 85. However, the first moving member 71 and the second moving member 72 may each have the contact part 85. In this case, the first moving member 71 and the second moving member 72 move from the fifth position to the sixth position, so that the contact part 85 may come into contact with the lever 43. Additionally, in this case, the first lever moving member 81 and the second lever moving member 82 may be omitted.

Even in the case where the first moving member 71 and the second moving member 72 each have the contact part 85, the contact part 85 preferably comes into contact with the lever 43 in the state in which the pressing part 73 is in contact with the process frame 33. With such a configuration, the lever 43 can be moved from the third position to the fourth position in the state in which the process frame 33 is positioned with respect to the body frame 60.

In addition, even in the case where the first moving member 71 and the second moving member 72 each have the contact part 85, the contact part 85 preferably comes into contact with the lever 43 after the pressing part 73 comes into contact with the process frame 33. Thereby, after the process frame 33 is positioned with respect to the body frame 60, the lever 43 can be moved from the third position to the fourth position.

In addition, even in the case where the first moving member 71 and the second moving member 72 each have the contact part 85, the contact part 85 preferably comes into contact with the lever 43 in a state in which the electrical contact 75 is in contact with the electrical contact surface 51 of the memory 50. With such a configuration, the lever 43 can be moved from the third position to the fourth position in the state in which the electrical contact 75 is positioned with respect to the electrical contact surface 51.

In addition, even in the case where the first moving member 71 and the second moving member 72 each have the contact part 85, the contact part 85 preferably comes into contact with the lever 43 after the electrical contact 75 comes into contact with the electrical contact surface 51 of the memory 50. Thereby, after the electrical contact 75 is positioned with respect to the electrical contact surface 51, the lever 43 can be moved from the third position to the fourth position.

5-3. Other Modified Embodiments

In the above embodiment, the four process cartridges 1 can be mounted on one drawer 2. However, the number of process cartridges 1 that can be mounted on one drawer 2 may be one, two, three, or five or more.

Additionally, each element appearing in the above embodiment and modified embodiments may be arbitrarily combined as long as there is no conflict.

What is claimed is:

1. An image forming apparatus comprising:
- a body frame having an opening;
- a drawer configured to be movable through the opening between a first position at which the drawer is located inside the body frame and a second position at which the drawer is drawn outward from the body frame;
- a process cartridge configured to be attachable to and detachable from the drawer, the process cartridge comprising:
  - a process frame configured to store toner;
  - a photoconductor drum configured to be rotatable about a drum axis extending in a first direction;
  - a developing roller configured to be movable between a contact position at which the developing roller contacts the photoconductor drum and a separated position at which the developing roller is separated from the photoconductor drum; and
  - a separation holding mechanism comprising a lever configured to be movable with respect to the process frame between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving an external force in a state in which the lever is located at the fourth position; and a moving mechanism configured to be movable with respect to the process frame in at least a second direction intersecting the first direction, the moving mechanism comprising at least one contact part configured to be allowed to contact the lever in response to movement of the moving mechanism in the second direction, at least one pressing part configured to be allowed to press the process frame toward the drawer in response to the movement of the moving mechanism in the second direction, and at least one urging member configured to urge the at least one pressing part toward the drawer.

2. The image forming apparatus according to claim 1, wherein the moving mechanism is configured to be movable in the second direction between a fifth position where the at least one pressing part is separated from the process frame and a sixth position where the at least one pressing part contacts the process frame.

3. The image forming apparatus according to claim 2, wherein in response to the moving mechanism moving from the fifth position to the sixth position, the at least one pressing part comes into contact with the process frame and presses the process frame toward the drawer.

4. The image forming apparatus according to claim 2, wherein the at least one contact part is configured to contact the lever and to move the lever from the third position to the fourth position in a state in which the at least one pressing part contacts the process frame.

5. The image forming apparatus according to claim 2, wherein the process frame comprises:

a first surface intersecting the second direction; and second surfaces located on both sides of the first surface in the first direction, the second surfaces being closer to the drawer than the first surface, and wherein in a state in which the drawer mounted with the process cartridge is mounted on the body frame, an interval in the second direction between the second surfaces and the body frame is greater than an interval in the second direction between the first surface and the body frame.

6. The image forming apparatus according to claim 2, wherein the process cartridge comprises a memory comprising an electrical contact surface, and wherein the moving mechanism comprises an electrical contact configured to contact the electrical contact surface in a state in which the moving mechanism is arranged at the sixth position.

7. The image forming apparatus according to claim 6, wherein the electrical contact is movable with respect to the moving mechanism in a direction intersecting the second direction.

8. The image forming apparatus according to claim 6, wherein the at least one pressing part and the electrical contact are located in a same plane perpendicular to the first direction.

9. The image forming apparatus according to claim 6, wherein the at least one pressing part comprises two pressing parts located on both sides of the electrical contact in a third direction intersecting the first direction and the second direction.

10. The image forming apparatus according to claim 2, wherein the moving mechanism comprises:

a first moving member located at a first end of the body frame in the first direction; and a second moving member located at a second end of the body frame opposite to the first end in the first direction.

11. The image forming apparatus according to claim 10, wherein the at least one pressing part comprises:

two first pressing parts provided on the first moving member and located on both sides of the electrical contact in a third direction intersecting the first direction and the second direction; and one second pressing part provided on the second moving member, or two second pressing parts provided on the second moving member and having an interval narrower than that of the two pressing parts in the third direction.

12. The image forming apparatus according to claim 10, wherein the at least one pressing part comprises:

a first pressing part provided on the first moving member; and a second pressing part provided on the second moving member, wherein the at least one urging member comprises:

a first urging member provided on the first moving member and configured to urge the first pressing part toward the drawer; and a second urging member provided on the second moving member and configured to urge the second pressing part toward the drawer, and wherein an urging force of the first urging member is less than an urging force of the second urging member.

13. The image forming apparatus according to claim 6, wherein the memory is located at a first end of the process frame in the first direction, wherein the process cartridge further comprises a coupling located at a second end of the process frame opposite to the first end in the first direction, and wherein the image forming apparatus further comprises a driving shaft configured to input a driving force to the coupling.

14. The image forming apparatus according to claim 2, further comprising:

a front cover configured to rotate between an open position at which the opening is opened and a closed position at which the opening is closed; and a cam configured to rotate in response to rotation of the front cover from the open position to the closed position, wherein the moving mechanism is moved from the fifth position to the sixth position in response to rotation of the cam.

15. The image forming apparatus according to claim 6, wherein the electrical contact is configured to contact the electrical contact surface after the at least one pressing part contacts the process frame.

16. The image forming apparatus according to claim 6, wherein the fourth position is a position farther separated from the memory than the third position.

17. The image forming apparatus according to claim 2, wherein a movement distance of the moving mechanism in the second direction from the fifth position to the sixth position is greater than a movement distance of the lever in the second direction from the third position to the fourth position.

18. The image forming apparatus according to claim 10, wherein the moving mechanism is configured to be movable in a third direction in addition to the first direction, the third direction intersecting the first direction and the second direction, wherein the moving mechanism comprises:

a first lever moving member located at the first end of the body frame in the first direction and configured to be movable with respect to the first moving member in the third direction; and a second lever moving member located at the second end of the body frame in the first direction and configured to be movable with respect to the second moving member in the third direction, wherein the at least one pressing part comprises:

a first pressing part provided on the first moving member; and a second pressing part provided on the second moving member, wherein the at least one contact part comprises:

a first contact part provided on the first lever moving member; and a second contact part provided on the second lever moving member, wherein in response to the moving mechanism moving in the third direction, the at least one contact part comes into contact with the lever, wherein the first pressing part is located closer to the first end of the process frame in the first direction than the first contact part, and wherein the second pressing part is located closer to the second end of the process frame in the first direction than the second contact part.

19. An image forming apparatus comprising:

a body frame having an opening;

a drawer configured to be movable in a third direction through the opening between a first position at which the drawer is located inside the body frame and a second position at which the drawer is drawn outward from the body frame; and a process cartridge configured to be attachable to and detachable from the drawer, the process cartridge comprising:

a process frame configured to store toner;

a photoconductor drum configured to be rotatable about a drum axis extending in a first direction intersecting the third direction;

a developing roller configured to be movable between a contact position at which the developing roller contacts the photoconductor drum and a separated position at which the developing roller is separated from the photoconductor drum; and a separation holding mechanism comprising a lever configured to be movable with respect to the process frame in a second direction intersecting the first direction and the third direction between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving external force in a state in which the lever is located at the fourth position, wherein the body frame comprises a wall portion configured to come into contact with one end of the lever in response to the drawer mounted with the process cartridge moving in the third direction through the opening in a state in which the lever is arranged at the fourth position.

20. A process cartridge comprising:

a process frame configured to store toner;

a photoconductor drum configured to be rotatable about a drum axis extending in a first direction;

a developing roller configured to be rotatable about a developing axis extending in the first direction, the developing roller being configured to be movable between a contact position at which the developing roller contacts the photoconductor drum and a separated position at which the developing roller is separated from the photoconductor drum;

a separation holding mechanism comprising a lever configured to be movable with respect to the process frame between a third position and a fourth position and an elastic member configured to urge the lever from the fourth position toward the third position, the separation holding mechanism being configured to maintain the developing roller at the separated position in a state in which the lever is located at the third position and to allow the developing roller to move to the contact position in response to the lever receiving external force in a state in which the lever is located at the fourth position;

a developing electrode located on one end side of the process frame in the first direction, the developing electrode comprising an electrical contact; and a memory located on the one end side of the process frame in the first direction, the memory comprising an electrical contact surface, wherein the lever located on the one end side of the process frame in the first direction is farther separated from the electrical contact of the developing electrode than the memory in the first direction, and wherein the lever overlaps the developing electrode in a second direction intersecting the first direction.

* * * * *